Figure 1A:
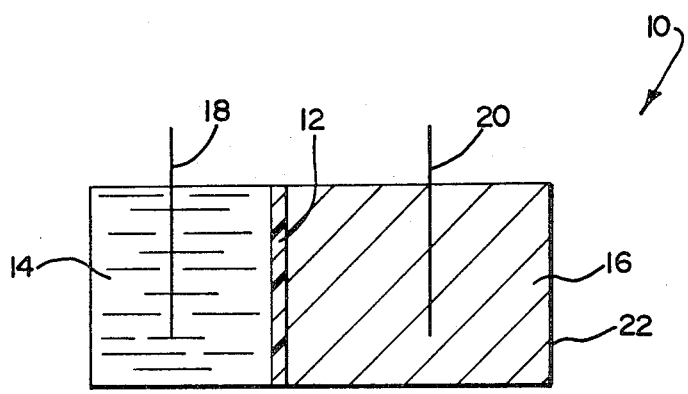

United States Patent [19]

Bones et al.

[11] Patent Number: 4,626,483
[45] Date of Patent: Dec. 2, 1986

[54] ELECTROCHEMICAL CELL

[75] Inventors: Roger J. Bones, Abingdon; David A. Teagle; Steven D. Brooker, both of Swindon; Roy C. Galloway, Park Nook Quarndon, all of England

[73] Assignee: Lilliwyte Societe Anonyme, Luxembourg

[21] Appl. No.: 778,668

[22] Filed: Sep. 23, 1985

[30] Foreign Application Priority Data

Sep. 21, 1984 [GB] United Kingdom ............... 8423961

[51] Int. Cl.$^4$ ................... H01M 4/52; H01M 10/39
[52] U.S. Cl. .................... 429/50; 429/103; 429/223
[58] Field of Search ............. 429/102, 103, 223, 50

[56] References Cited

U.S. PATENT DOCUMENTS

| | | | |
|---|---|---|---|
| 3,877,984 | 4/1975 | Werth | 429/103 |
| 3,988,163 | 10/1976 | Sklarchuk | |
| 4,063,005 | 12/1977 | Mamantou et al. | |
| 4,452,777 | 6/1984 | Abraham et al. | |
| 4,457,989 | 7/1984 | Coetzer | 429/102 |
| 4,546,055 | 10/1985 | Coetzer et al. | 429/103 |

FOREIGN PATENT DOCUMENTS

WO83/01539 4/1983 PCT Int'l Appl.

OTHER PUBLICATIONS

Marassi et al., Electrooxidation of Sulfer in Molten AlCl$_3$ NaCl (63–37 Mole Percent), 1979, J. Electrochem. Soc., vol. 126, No. 2, pp. 231–237.
Abraham et al., Moderate Temperature Sodium Cells—V. Discharge Reactions and Rechargability of NiS NiS$_2$ Positive Electrodes In Molten Sodium Aluminum Chloride, Oct. 1984, J. Electrochem. Soc., pp. 2211–2217.

Primary Examiner—Donald L. Walton
Attorney, Agent, or Firm—Arnold, White & Durkee

[57] ABSTRACT

The invention provides a cathode for an electrochemical cell, an electrochemical cell including the cathode, and a method of resisting a progressive drop in the capacity of the cathode with repeated charge/discharge cycling thereof. The invention involves doping the electrolyte, which is a sodium aluminium halide molten salt electrolyte containing chloride ions, and/or the active cathode substance, which is a nickel containing substance with a minor proportion of a chalcogen so that the chalcogen is dispersed therein.

19 Claims, 28 Drawing Figures

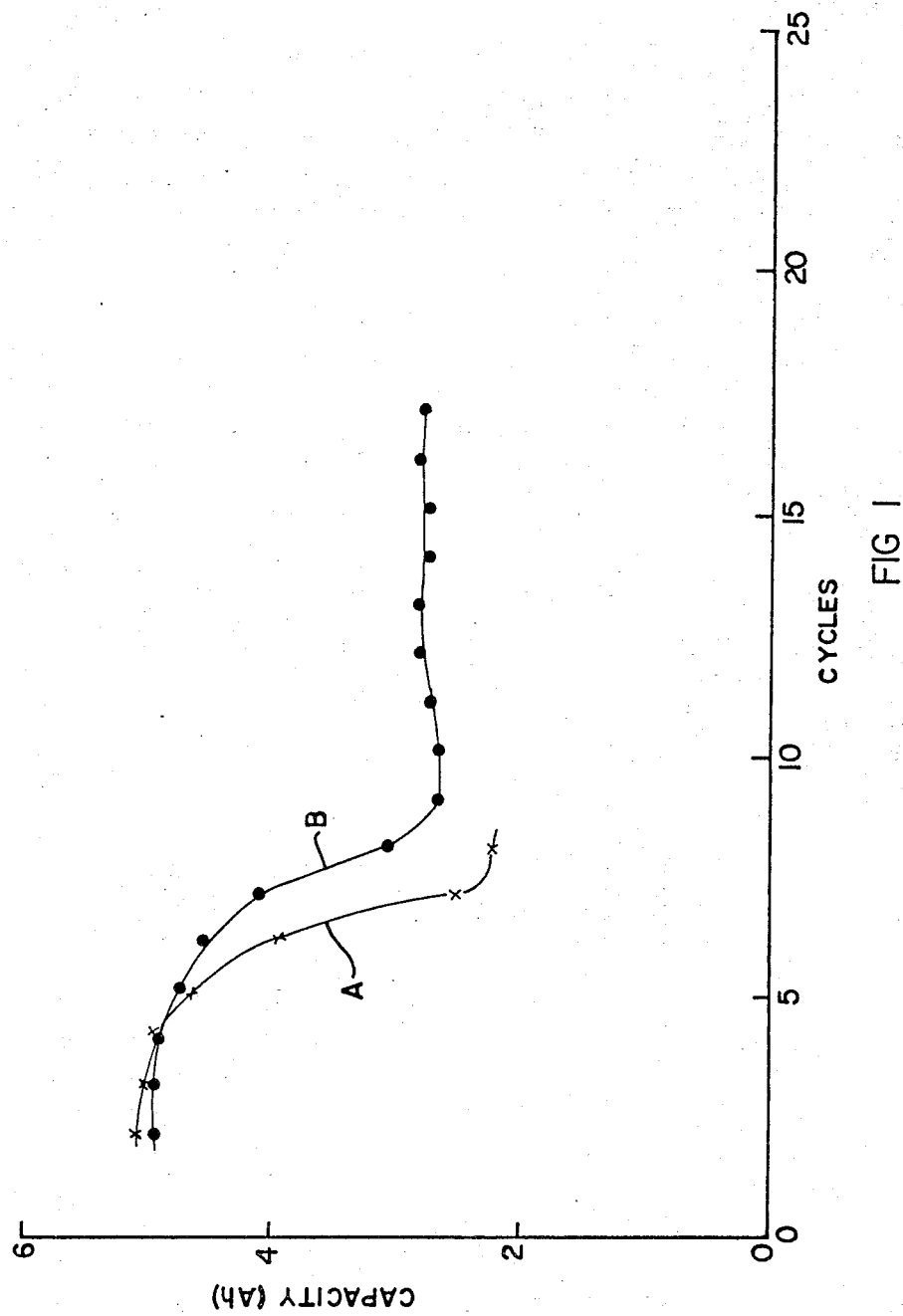

ELECTROCHEMICAL CELL

This invention relates, broadly, to electrochemical cells. More particularly, it relates to a cathode for an electrochemical cell; to an electrochemical cell including such cathode; to a method of resisting a progressive drop in the capacity of such cathode.

According to one aspect of the invention there is provided a cathode for an electrochemical cell which comprises an electronically conductive electrolyte-permeable macroscopically porous matrix impregnated with a sodium aluminum halide molten salt liquid electrolyte which contains chloride ions and is molten at the operating temperature of the cathode, the matrix having a chlorinated nickel-containing substance dispersed therein as the active cathode substance, a minor proportion of a suitable chalcogen being dispersed in at least one member of the group comprising said electrolyte and said active cathode substance, for resisting a progressive drop in the capacity of the cathode with repeated charge/discharge cycling thereof.

The chalcogen may comprise selenium and/or sulphur, preferably the latter.

The active cathode substance may include $NiCl_2$ itself, one or more compounds of nickel which have been chlorinated, or combinations of the aforegoing. In a particular embodiment, the matrix itself may comprise nickel, with the active cathode substance comprising $NiCl_2$. Instead, the matrix may comprise a material which does not contain nickel, the active cathode substance comprising an intermediate refractory hard metal compound of nickel, such as a carbide, nitride, phosphide, boride or silicide thereof, which has been activated by halogenation. The nickel which is chlorinated to form the active cathode substance, may be alloyed with a minor molar proportion of at least one member of the group comprising iron, chromium, cobalt and manganese, and these alloys or nickel itself when used alone may contain minor molar proportions of at least one member of the group comprising phosphorus, boron, silicon, nitrogen and carbon.

The liquid electrolyte may contain not more than 10% by mass of the chalcogen, preferably not more than 5% and more preferably not more than 2%. Furthermore, the mass ratio of nickel in the chlorinated nickel-containing substance: sulphur in the cathode may be between 20:1 and 4:1, preferably between 16:1 and 12:1.

According to another aspect of the invention there is provided an electrochemical cell which comprises a cathode as described above, a sodium anode which is liquid at the operating temperature of the cell, a sodium aluminium halide molten salt liquid electrolyte in contact with the exterior of the cathode and having the same composition as the liquid electrolyte impregnated into the matrix of the cathode, and, between the anode and the electrolyte and isolating the anode from the electrolyte, a solid conductor of sodium ions or a micromolecular sieve which contains sodium sorbed therein.

By "isolating" is meant that any ionic sodium or metallic sodium moving from the anode to the electrolyte or vice versa has to pass through the internal structure of the solid conductor or through the microporous interior of the sieve, as the case may be.

Further according to the invention, in the operation of a cathode comprising an electronically conductive electrolyte-permeable matrix impregnated with a sodium aluminium halide molten salt liquid electrolyte which contains chloride ions and is molten at the operating temperature of the cathode, the matrix having a chlorinated nickel-containing substance dispersed therein as the active cathode substance, there is provided the method of resisting a progressive drop in the capacity of the cathode with repeated charge/discharge cycling thereof, which comprises doping at least one member of the group comprising the liquid electrolyte and the active cathode substance with a minor proportion of a suitable chalcogen so that the chalcogen is dispersed therein.

The chalcogen is preferably in extremely finely divided form, e.g. as a fine powder and it or reaction products between it and the liquid electrolyte or one or more components of the liquid electrolyte may even be so finely divided that they can be regarded as being dissolved in the electrolyte. Indeed doping of the liquid electrolyte with sulphur or selenium can be effected by addition thereto of one or more suitable sulphur- or selenium-containing compounds, provided that any impurities added in the doping can be tolerated in the electrolyte, and the invention accordingly extends to doping in this fashion. Thus sulphides such as nickel sulphide and sulphides of iron (Fe can be tolerated as an impurity in the electrolyte) can be used, or the corresponding selenides. This doping will lead to the presence in the liquid electrolyte of the chalcogen in question or the abovementioned reaction products of the chalcogen with the liquid electrolyte or one or more components of the electrolyte and will be equivalent to doping directly with the chalcogen.

The electrolyte is conveniently a sodium aluminium chloride molten salt electrolyte, which can, depending on the proportions of sodium and aluminium therein, have a melting point of the order of 150° C. or less, and wherein, also depending on its composition, the cathode substance can be virtually insoluble. This electrolyte may contain a minor proportion of up to, say, 20% by mass or less, of an alkali metal halide other than sodium chloride. The dopant may thus comprise an alkali metal fluoride, but the proportions of the constituents of the electrolyte should be selected such that the solubility of the active cathode substance in the electrolyte is kept to a minimum.

The applicant has found that the minimum solubility of the active cathode substance in the sodium aluminium chloride electrolyte (which may contain another alkali metal halide as described above), occurs when the molar ratio of the alkali metal halide to he aluminium halide is about 1:1, so that, the relative quantities of said alkali metal ions, aluminium ions and halide ions should conform substantially with the stoichiometric product: $MAlX_4$, wherein
M represents alkali metal cations; and
X represents halide anions.

Minor proportions of metal halide dopants may be tolerated in the electrolyte, eg substances which will ionize in the molten electrolyte to provide ions which affect the electrolytic action of the electrolyte, but their nature and quantity should be insufficient to alter the essential character of the electrolyte as a sodium aluminium chloride electrolyte, where in the $MAlX_4$ product is maintained.

When the cell contains a solid conductor of sodium ions, said solid conductor may be beta-alumina or nasicon, and in this case sodium should be the only alkali metal present in the liquid electrolyte.

Instead, when the cell contains an micromolecular sieve carrier, this carrier can be regarded as a conductor of sodium metal and/or sodium ions, depending on the mechanism whereby sodium is transported therethrough.

By "micromolecular sieve" is meant a molecular sieve having interconnected cavities and/or channels in its interior and windows and/or pores in its surface leading to said cavities and channels, the windows, pores, cavities and/or channels having a size of not more than 50 Angstroms and preferably less than 20 Angstroms. These pore sizes are to be contrasted with those of the macroporous matrix of the cathode, which are larger by at least two orders of magnitude, typically by three or four orders of magnitude.

Suitable micromolecular sieves are mineral micromolecular sieves, ie inorganic lattice or framework structures such as tectosilicates, eg the zeolites 13X, 3A, 4A or the like, although certain essentially organic micromolecular sieves such as clatherates may, in certain circumstances, be suitable.

The active cathode substance should preferably be evenly dispersed throughout the matrix; and it may be in finely divided particulate form and/or it may adhere as fine particles or a thin layer to the matrix, preferably so that there are no large particles of thick layers of active cathode substance present, and preferably so that none of the active cathode substance is spaced physically from the material of the matrix, which acts as a current collector, by an excessive spacing, eg in large cavities in the matrix. In other words, the active cathode substance preferably should be close to or adherent to the material of the matrix, and should be as thinly spread as possible, consistent with the porosity of the matrix and the quantity of the cathode substance required to be present. Large particles or thick layers of active cathode substance will not prevent the cell from working, but will merely be inefficient, a proportion of the active cathode substance remote from the matrix material amounting merely to dead weight.

A convenient way of making the cathode of the present invention, is by sintering under a reducing atmosphere such as $H_2$, powder mixes of Ni and NaCl, the powder mix being conveniently compacted around a nickel current collector, such as a nickel gauze. This produces a porous nickel matrix in electronic contact with the nickel current collector, and containing NaCl which is produced by discharge of cathodes in accordance with the present invention. This porous matrix can then be impregnated with the liquid electrolyte to produce the cathode of the present invention in its discharged state.

Impregnation of the matrix with an $NaAlCl_4$ liquid electrolyte, in which the molar proportions of $AlCl_3$ and NaCl are preferably 1:1 as described above, can then be effected with the chalcogen introduced into the cathode as a finely divided powder dispersed in the molten liquid electrolyte before it is impregnated into the matrix. Similarly, the liquid electrolyte in a cell according to the invention which is outside the matrix, in contact with the cathode and between the cathode and the solid conductor of sodium ions or micromolecular sieve, may have the same proportion or concentration of finely divided chalcogen dispersed therein.

The invention will now be described in more detail, with reference to the following non-limiting illustrative Examples and to the accompanying drawings, in which:

FIG. 1A shows a schematic illustrative drawing of a cell in accordance with the invention; and FIGS. 1 to 27 show graphical plots of various operating chacteristics of the cells described in the Examples.

EXAMPLE 1

Three substantially similar cathodes were prepared and were assembled into test cells. In the preparation of each of the cathodes 17,2 g of nickel powder (Inco Ni grade 255 available from International Nickel Company Limited) of 2–5 micron particle size was uniformly mixed with 11,25 g of dried NaCl of 53–125 micron particle size. The mixture was poured into a porous mould containing a central nickel gauze current collector and sintered under a hydrogen reducing atmosphere for 30 minutes at 790° C., to produce a sintered porous nickel matrix which was then vacuum impregnated with 80 g of molten $NaAlCl_4$ (equimolar NaCl and $AlCl_3$), the $NaAlCl_4$ in one case containing 0,8 g of finely divided elemental sulphur powder dispersed therein. The theoretical capacities of these cathodes was 5,2 Ah, in accordance with the cell reaction

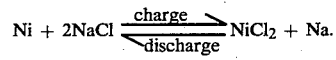

$$Ni + 2NaCl \underset{\text{discharge}}{\overset{\text{charge}}{\rightleftharpoons}} NiCl_2 + Na.$$

The artifacts as formed above were then assembled as cathodes into test cells having molten sodium anodes, $NaAlCl_4$ (equimolar NaCl and $AlCl_3$) liquid electrolytes and beta alumina separators isolating the anodes from the liquid electrolytes, the liquid electrolytes being in contact with the cathodes. The cell whose cathode had sulphur therein also had its liquid electrolyte outside the cathode doped with the same proportion (1% m/m) of sulphur. The beta alumina was in the form of a hollow cylinder, with one of the cell electrodes being inside the beta alumina and the other being outside it. The surface area of the beta alumina in contact with the sodium of the anode was 50 $cm^2$, the contact area between the beta-alumina and liquid electrolyte being greater.

In this regard a schematic illustrative drawing of a cell in accordance with the invention is shown in FIG. 1A of the drawings, in which a typical test cell in accordance with the invention is shown. Such cell is assembled under an argon atmosphere, and is generally designated in the drawing by reference numeral 10. The cell comprises a beta-alumina solid electrolyte 12 which separates and isolates the sodium anode 14 of the cell from its molten salt liquid electrolyte and cathode. The cathode, impregnated with electrolyte and surrounded by electrolyte, which electrolyte is in contact with the beta-alumina solid electrolyte separator 12, is shown at 16. The anode 14 and cathode 16 are shown with suitable current collectors respectively designated 18 and 20, and the beta-alumina separator 12 is arranged so that it forms a continuous barrier between the cathode/electrolyte 16 on the one hand, and the anode 14 on the other hand, within the cell housing 22.

The three assembled cells were heated to 250° C. and subjected to a number of charge and discharge cycles, as shown in FIGS. 1, 2, 3 and 4, after activation or preconditioning thereof by charging at 0,2 A (about 4 $mAcm^{-2}$) to a 2,8 V limit.

The two cells to which no sulphur had been added acted as controls, and FIG. 1 is a plot of their capacity against the number of charge/discharge cycles to which they were subjected. During these cycles they were charged at 5 mAcm$^{-2}$ and discharged at 20 mAcm$^{-2}$. The cells were charged and discharged about once a day, except that one of these control cells had its 5th discharge cycle interrupted, during which interruption it was held at its open circuit voltage at 250° C. for a period of 5 days. The curve for this cell is shown as A in FIG. 1, the curve for the other cell, whose cycles were not interrupted, being shown as B in FIG. 1.

Both curves in FIG. 1 show a characteristic capacity loss to about 50% of theoretical capacity after 10 cycles. It was established that the capacity loss occurred during the recharge half cycles, and as demonstrated by curve A in FIG. 1, the discharge loss was a function of charge/discharge cycling, and not just the period of time spent at 250° C.

From photomicrographs taken of the porous metal matrix before and after capacity loss, it was established that the capaicity loss was associated with a morphology change in the porous metal matrix, in accordance with which the nickel metal particles or crystallites were seen to undergo a grain growth from relatively small nickel crystals at the start of cycling, to relatively large nickel crystals after the capacity loss had taken place, with an associated reduction in active surface area, and a redistribution in the porosity (fine or coarse) of the maatrix. Instead or in addition, the capacity loss could be related to dissociation of nickel crystals from the current collector.

The capacity loss was found to be irreversible and was found to occur more rapidly at higher temperatures of 300°–400° C. This capacity loss was apparently not associated with any rise in the internal resistance of the cathode or other cell components such as seals of the test cells.

Figure 2:
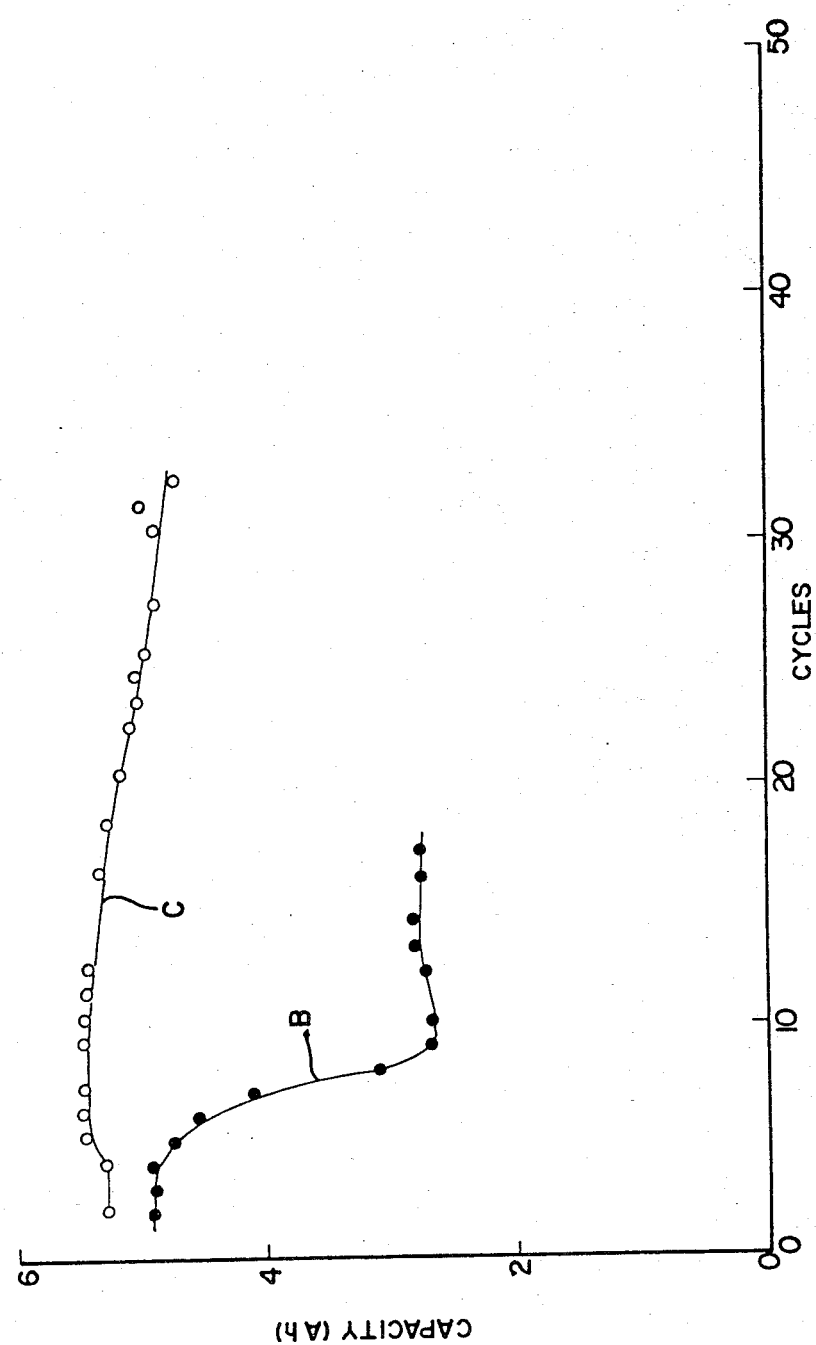

FIG. 2 is a similar plot of capacity against number of charge/discharge cycles, and the plot for the test cell shown at B in FIG. 1 (and again at B in FIG. 2), is compared with a similar plot for the cell in accordance with the invention to whose cathode sulphur was added as described above in the liquid electrolyte impregnated into the cathode, for the same charge and discharge rates as in FIG. 1. In this regard it should be noted that the NaAlCl$_4$ liquid electrolyte which was not impregnated into the cathode but which surrounded the cathode in the cathode compartment and was in contact with the beta-alumina had, as mentioned above, the same proportion of sulphur dispersed therein.

FIG. 2 demonstrates the excellent capacity retention of the cathode incorporating sulphur in accordance with the invention, as shown at C.

Figure 3:
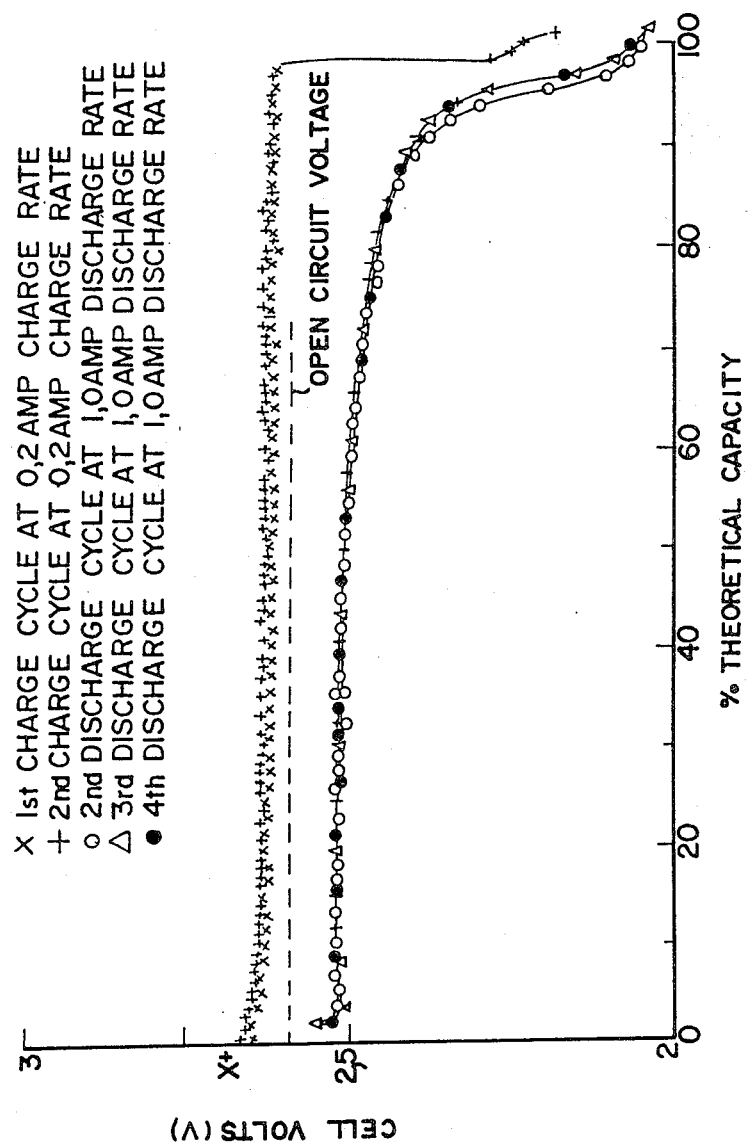
Figure 4:
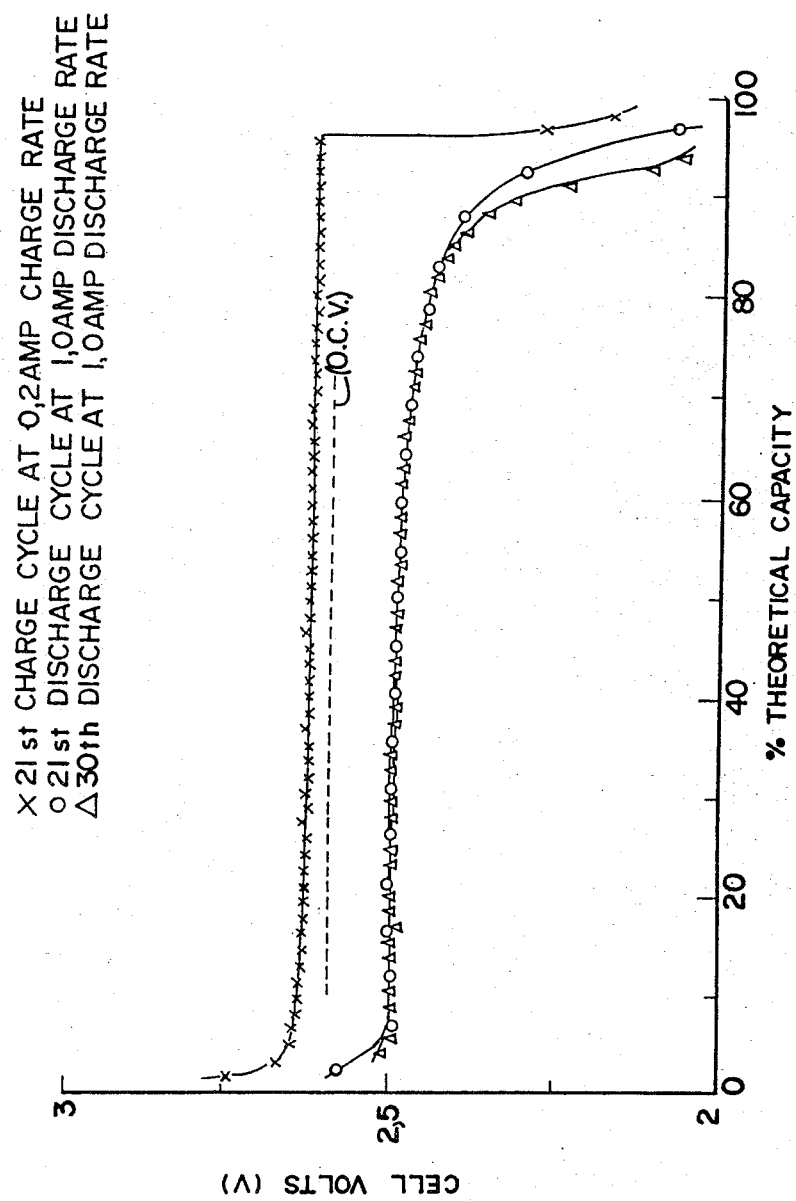

FIGS. 3 and 4 show selected charge and discharge cycles for the cathode in accordance with the invention, ie the cathode whose plot is shown as C in FIG. 2. FIG. 3 shows the first and second charge cycle, and the second, third and fourth discharge cycles, whereas FIG. 4 shows the 21st charge cycle and the 21st and 30th discharge cycles.

It should be noted with regard to FIGS. 3 and 4 that the cell whose cathode contains sulphur in accordance with the invention was in this case charge at a rate of 4 mAcm$^{-2}$ and discharged at a rate of 20 mAcm$^{-2}$, based on the beta-alumina area of 50 cm$^2$, the discharge rate of 20 mACm$^{-2}$ amounting in absolute terms to about 1 A and the rate of 4 mAcm$^{-2}$ amounting to 0,2 A.

As Example 1 above showed the utility of the invention with reference to low energy density cathodes (about 0,17 Ah/cc), further tests were conducted, as set out in Example 2 hereunder, to demonstrate the utility of the invention with energy or capacity densities which are higher (eg about 0,3 Ah/g or 0,33 Ah/cc).

EXAMPLE 2

Further cathodes, broadly similar to those of Example 1, were again prepared for test purposes, being in this instance cathodes in accordance with the present invention and further control cathodes.

In each case 25,73 g of nickel (Inco Ni grade 287) was mixed with 16,48 g of dried NaCl of 53-125 micron particle size and sintered at 790° C. under a hydrogen reducing atmosphere for 30 minutes with a nickel gauze central current collector. In each case the sintered matrix was vacuum impregnated with 80 g of NaAlCl$_4$ (equimolar NaCl and AlCl$_3$), the cathode in accordance with the invention having 4 g of elemental sulphur (about 5% by mass) introduced into its NaAlCl$_4$ and the control having none. The theoretical capacity according to the cell reaction set out above with reference to Example 1 was in this case 7,7 Ah, showing that these cathodes were denser and thus had a higher energy density than those of Example 1. These cathodes were again assembled into test cells having liquid sodium anodes, beta alumina separators and NaAlCl$_4$ (equimolar NaCl and AlCl$_3$) liquid electrolytes connecting the cathodes to the beta-alumina separators, the NaAlCl$_4$ electrolyte outside the matrix in the cathode compartment again containing the same proportion (5% m/m) of sulphur as the electrolyte impregnated into the matrix of the cathode. The active sodium/beta-alumina interface was again 50 cm$^2$.

Three of these cells (including the control) were, as with Example 1 heated to 250° C. and activated by charging at 0,2A up to a 2,8 V limit. These three cells were then subjected to a number of charge and discharge cycles, as shown in FIGS. 5 and 6.

Figure 5:
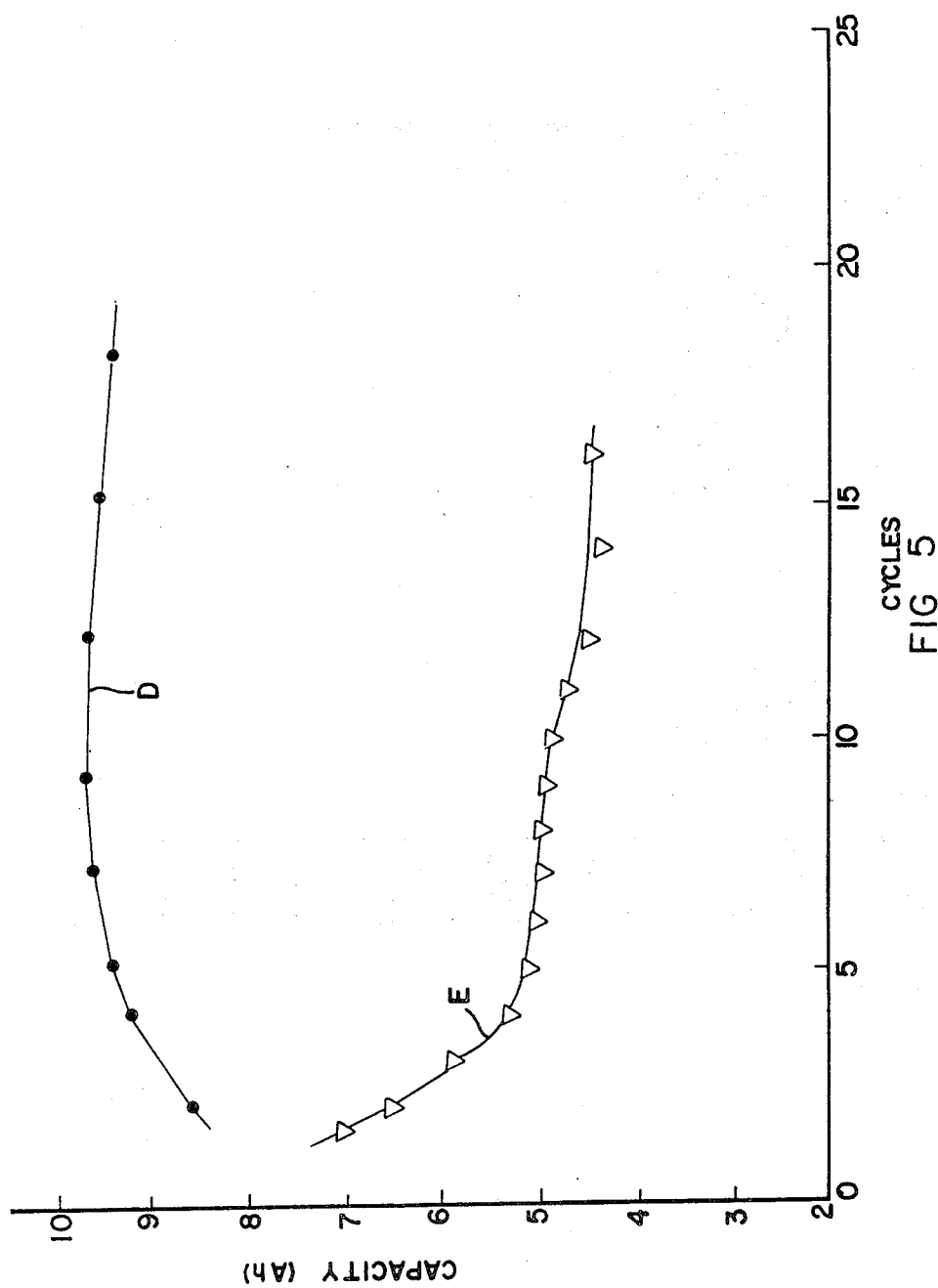

FIG. 5 is similar to FIG. 2, where the capacities of the control and one of the cells according to the invention (no. 2 in the Table hereunder) are shown against the number of cycles to which these two cells were subjected, the plot for the cell in accordance with the invention being shown at D, and the control being shown at E. Once again a substantial and rapid drop in capacity was apparent for the control, but the cathode in accordance with the invention showed no such drop, and indeed a slight increase above the theoretical capacity. This increase in capacity is attributable to a proportion of the sulphur impregnated into the cathode being charged and discharged, and contributing to the cathode reaction.

Figure 6:
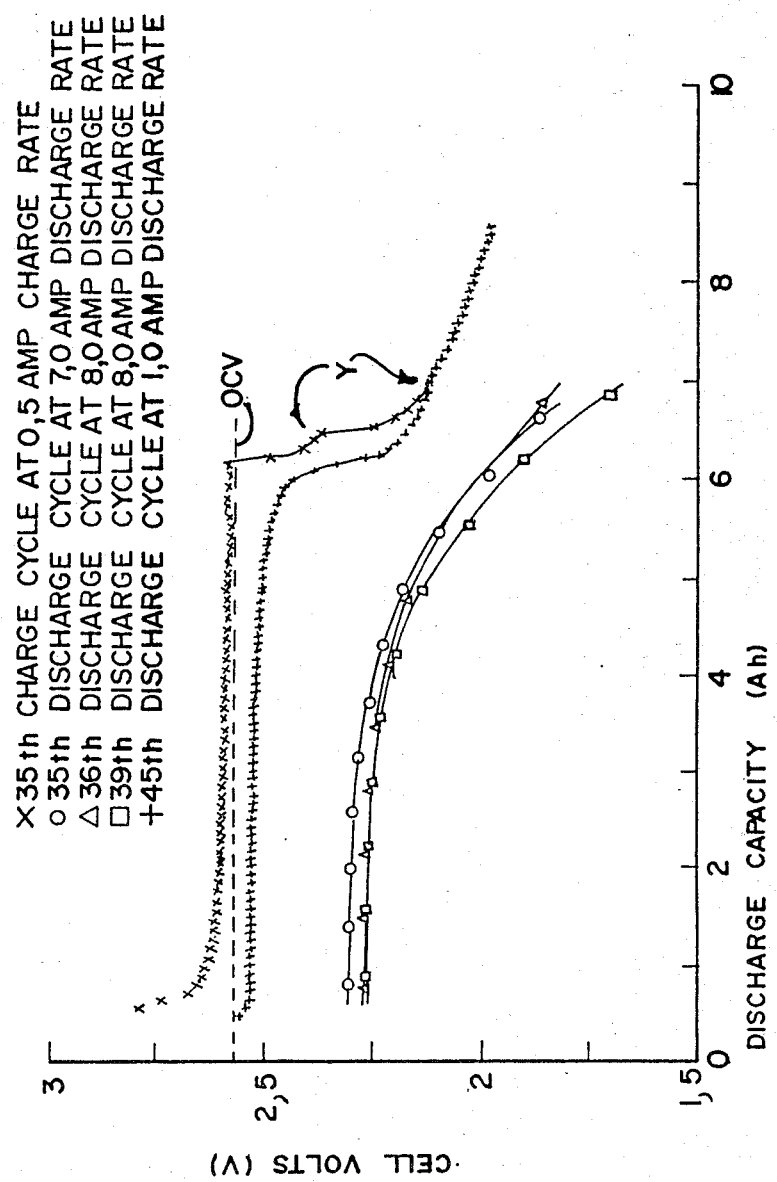

FIG. 6 is a plot of cell voltage against capacity, for selected charge and discharge half cycles of the other cell in accordance with the invention whose cathode contains sulphur (no. 4 in the Table hereunder). The 35th, 36th, 39th and 45th discharge cycles are shown, together with the 35th charge cycle.

It should be noted with reference to FIG. 5 that charging took place at 4 mAcm$^{-2}$ and discharge at 20 mAcm$^{-2}$ (approximately equal to absolute currents of 0,2 A and 1,0 A). In FIG. 6 various different charging and discharging rates were employed. With regard to FIG. 6, the contribution to cell capacity caused by the sulphur is visible in the two plateaus shown at Y.

A further two identical cathodes were prepared in the same fashion according to the invention from Inco Ni grade 287 nickel and NaCl of 53–125 micron particle size, and were assembled into identical cells employing NaAlCl$_4$ electrolyte made from equimolar NaCl and AlCl$_3$ containing 5% by mass sulphur. This gave a total of five cells (including the control). Two of the cells having sulphur in their cathodes were operated at fixed low rate regimes for life test purposes, while two others were operated over widely ranging conditions of temperature and charging or discharge rates. A summary of test results in shown in the following Table.

discharge cycles, and the plot for cell no. 4 at 350° C. is in fact shown in FIG. 6.

Figure 11:
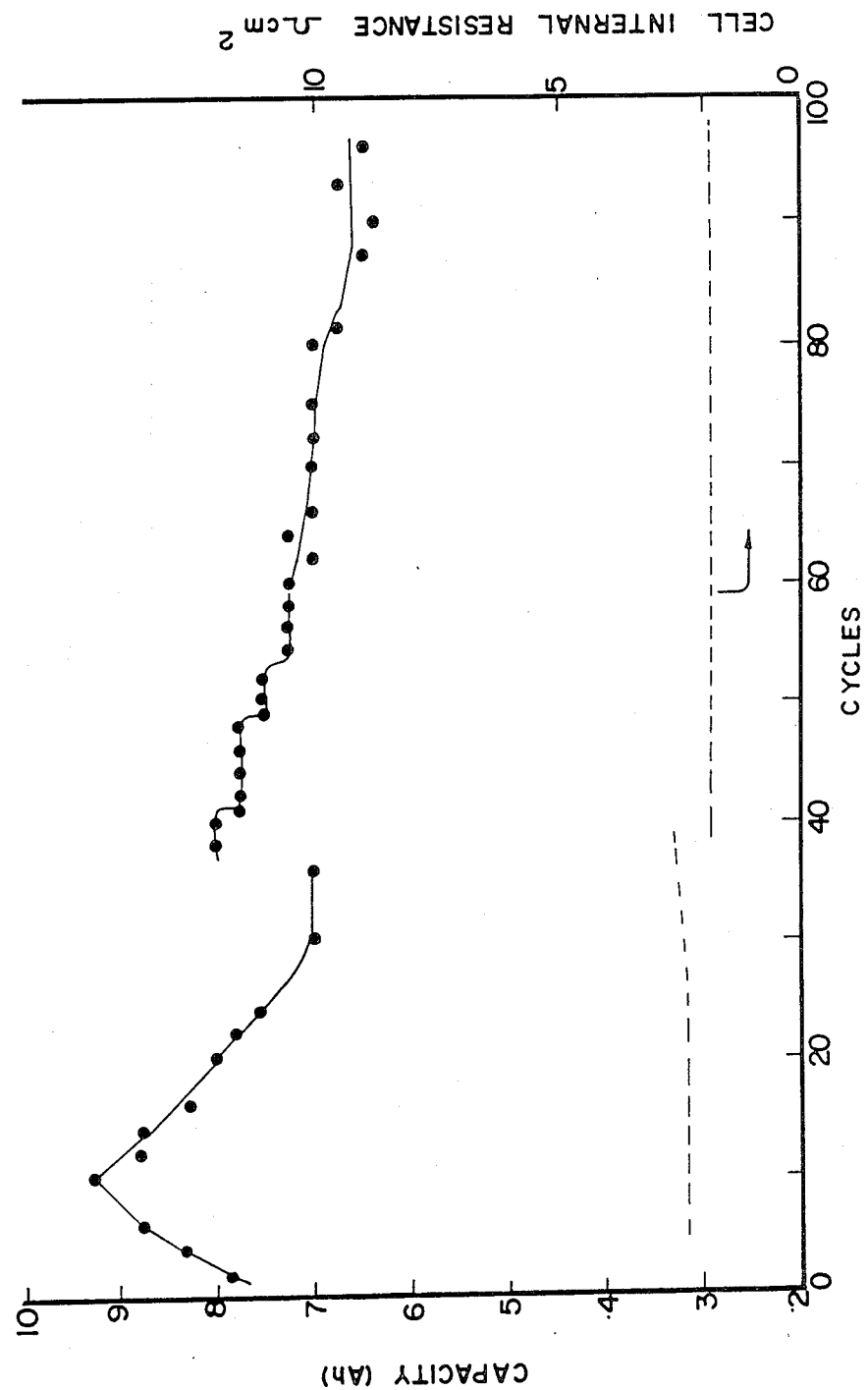
Figure 12:
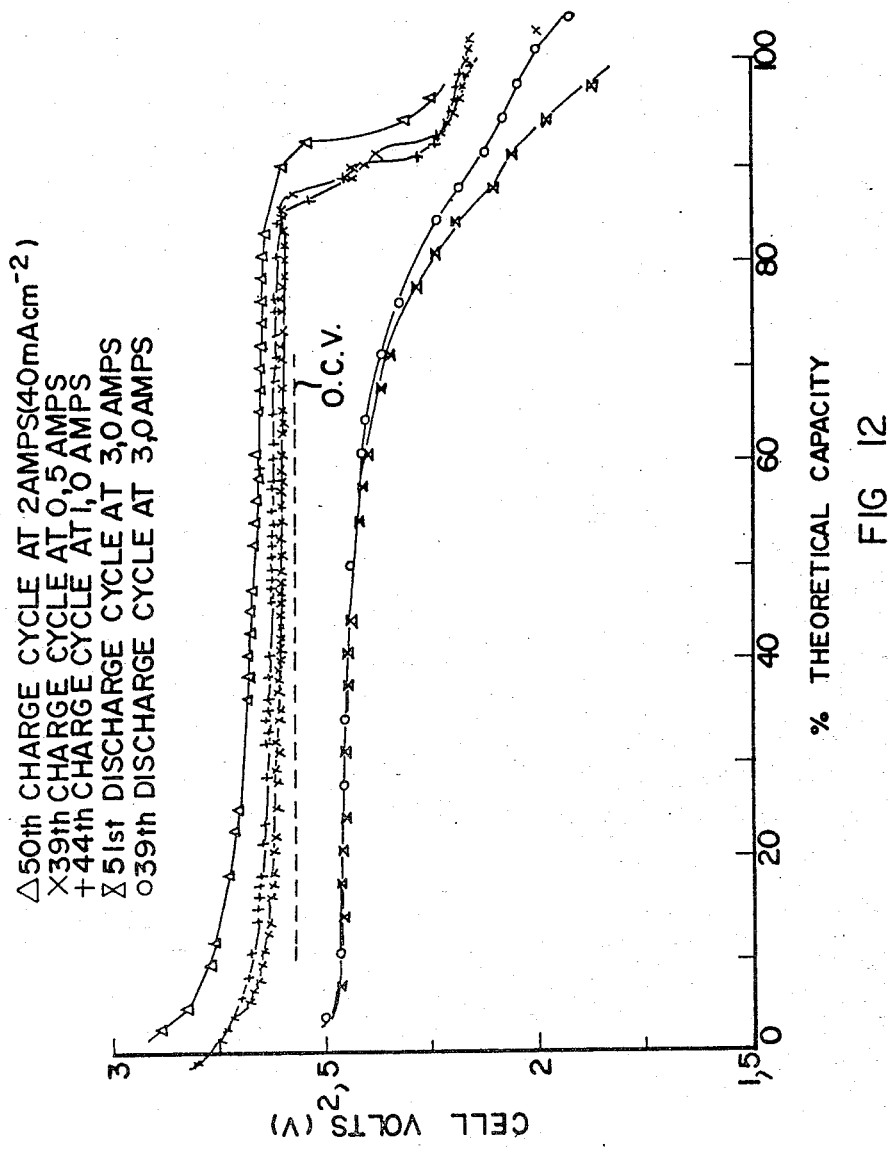

FIGS. 11 and 12 deal with cell no 5, FIG. 11 showing a plot of capacity in Ah and cell internal resistance in ohm-cm$^2$ against number of cycles, with FIG. 12 showing a plot of cell voltage against % theoretical capacity for selected half cycles. After conditioning, this cell was operated at 300° C. for an initial period, and at 350° C. thereafter, the change from 300° C. to 350° C. taking place between the 38th and 40th cycles.

The conclusions to be drawn from Example 2 were that the addition of the sulphur to the cathodes had a

TABLE

| Cell No | % m/m Sulphur in electrolyte | Temp °C. | Discharge rates mA cm$^{-2}$ | Charge rates mA cm$^{-2}$ | Cell resistance ohm-cm$^2$ | Comments on performance |
|---|---|---|---|---|---|---|
| Control 1 | 0 | 300 | 20 | 4 | 2,4 | Typical capacity loss in first 10 cycles as seen with Ni cathodes. (34% loss in 5 cycles). No resistance rise. |
| 2 | 5 | 250 | 20 | 4–10 | 3,1–3,5 | Excellent capacity retention - still at least 100% after 35 cycles. Very slight rise in cell resistance. |
| 3 | 5 | 300 | 20 | 4–10 | 2,4–3,0 | Excellent capacity retention - 100% after 35 cycles. Very slight rise in cell resistance |
| 4 | 5 | 250 | 20 | 5 | 2,5 | Operated over wide range of conditions - up to 160 mA cm$^{-2}$ and 400° C. Good capacity retention up to 350° C. - capacity loss accelerated at 400° C. Cell resistance remained very low throughout. |
|   |   | 300 | 60–100 | 5–10 | 2,5 |   |
|   |   | 350 | 100–160 | 10 | 2,0–1,9 |   |
|   |   | 400 | 20 | 40 | 1,8 |   |
| 5 | 5 | 300 | 60 | 5 | 2,4–2,6 | Fixed moderate discharge. Cell used to study recharge rates on continuous cycling. Excellent capacity retention - about 93% after 70 cycles. |
|   |   | 350 | 60 | 10–40 | 1,8 |   |

Results from testing these cells are shown in FIGS. 5 and 6 mentioned above and also in FIGS. 7 to 12 which are largely self-explanatory. It should be noted that in the Table, and in FIGS. 7 to 12 the control cell without sulphur is designated cell no. 1, the two cells used for life time tests being designated cells 2 and 3, and the remaining two cells being designated cells 4 and 5. Curves D and E from FIG. 5 are shown again as curves 1 and 2 in FIG. 7 for ease of comparison, curve D in FIG. 5 being in fact obtained from cell no. 2.

Figure 7:
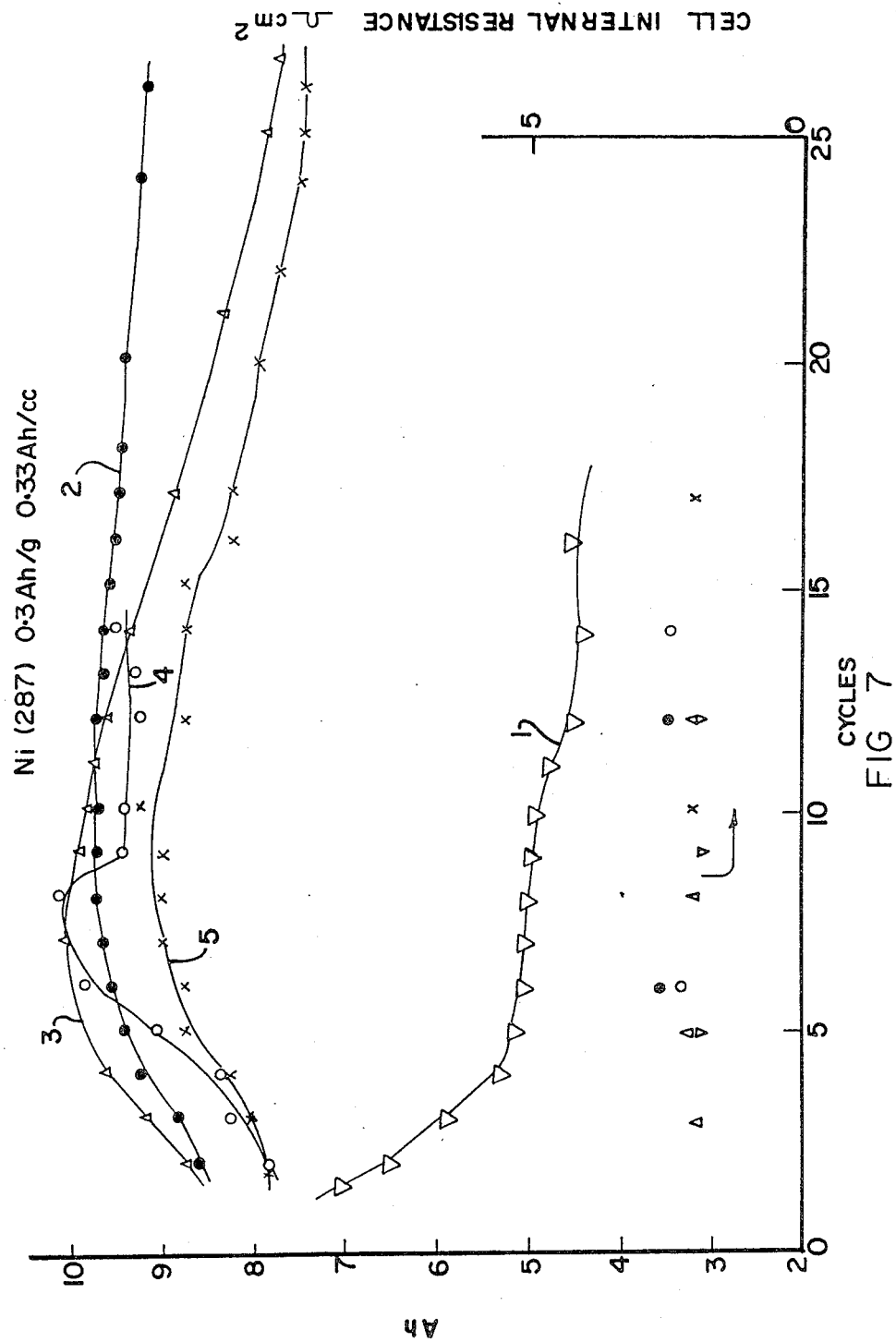

FIG. 7 is a plot, against number of cycles, of capacity in ampere hours and cell internal resistances in ohm-cm$^2$, for all the cells which according to the cell reaction set out in Example 1, had a theoretical capacity of about 7,5–7,7 Ah. Continuous plots are shown of capacity against the number of cycles, whereas individual plots are given of cell internal resistances against the number of cycles.

The conditions under which the cells were operated for FIG. 7 are in general set out in the Table, but it should be noted that in the case of cell no 4 that after the 15th charge cycle its temperature and discharge rate were increased stepwise from 250° C. and 20 mAcm$^{-2}$ at cycle no 15 up to a maximum of 160 mAcm$^{-2}$ (8,0 A) at 350° C. Only the early portion comprising the first 15 cycles for this cell is shown in FIG. 7.

In the case of cell no 5 FIG. 7 shows only the initial period of operation when it was operated at 300° C.

Figure 8:
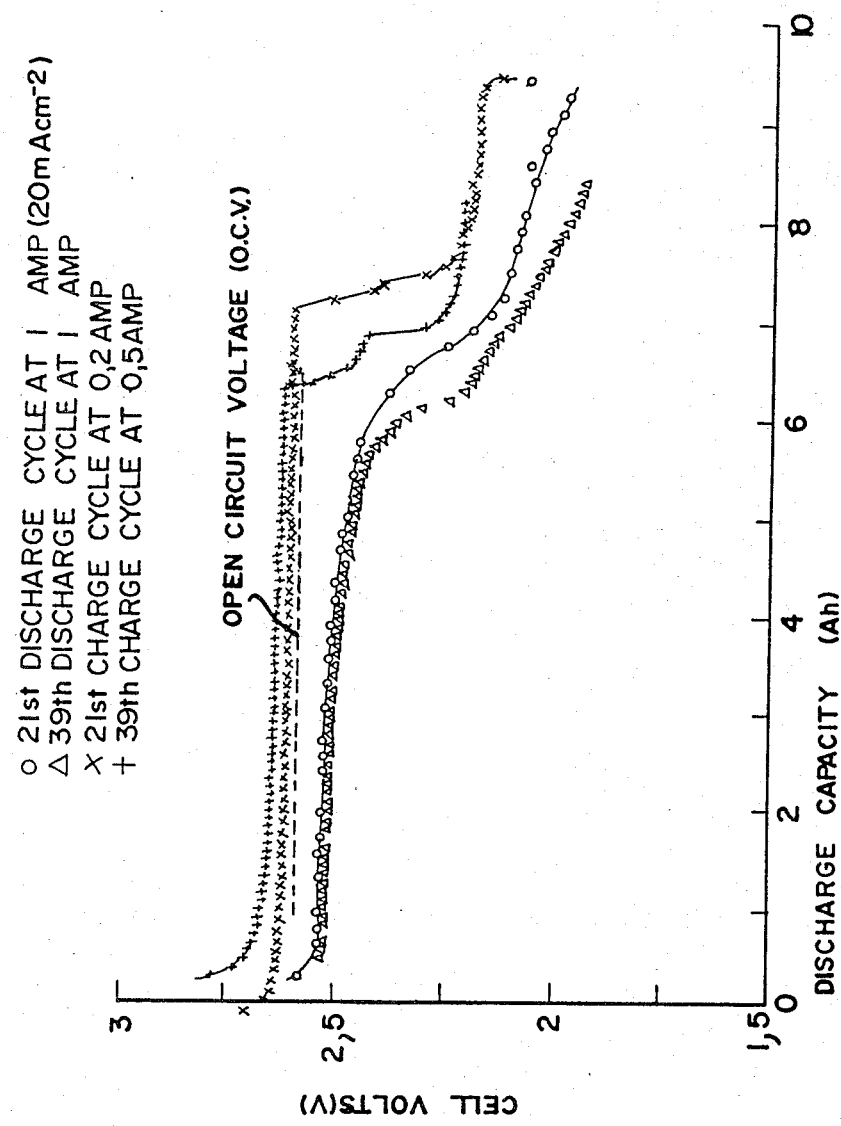
Figure 9:
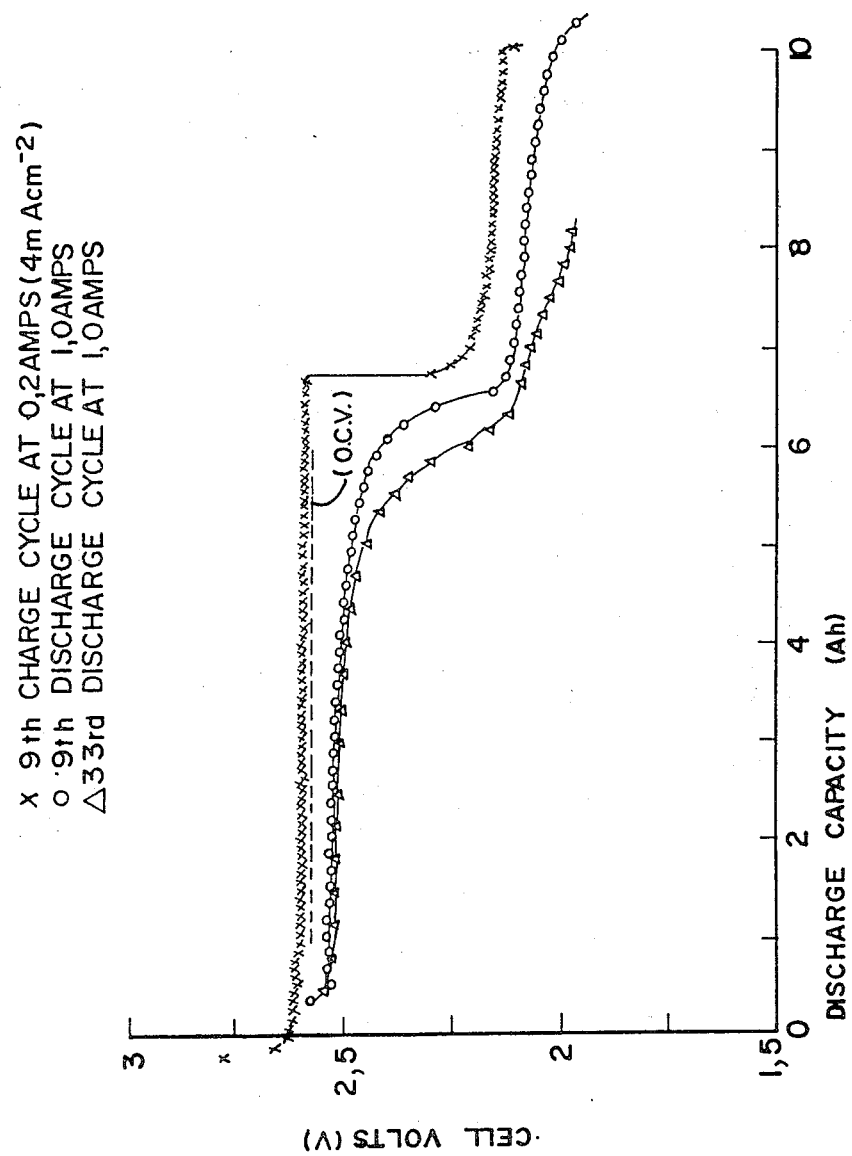
Figure 10:
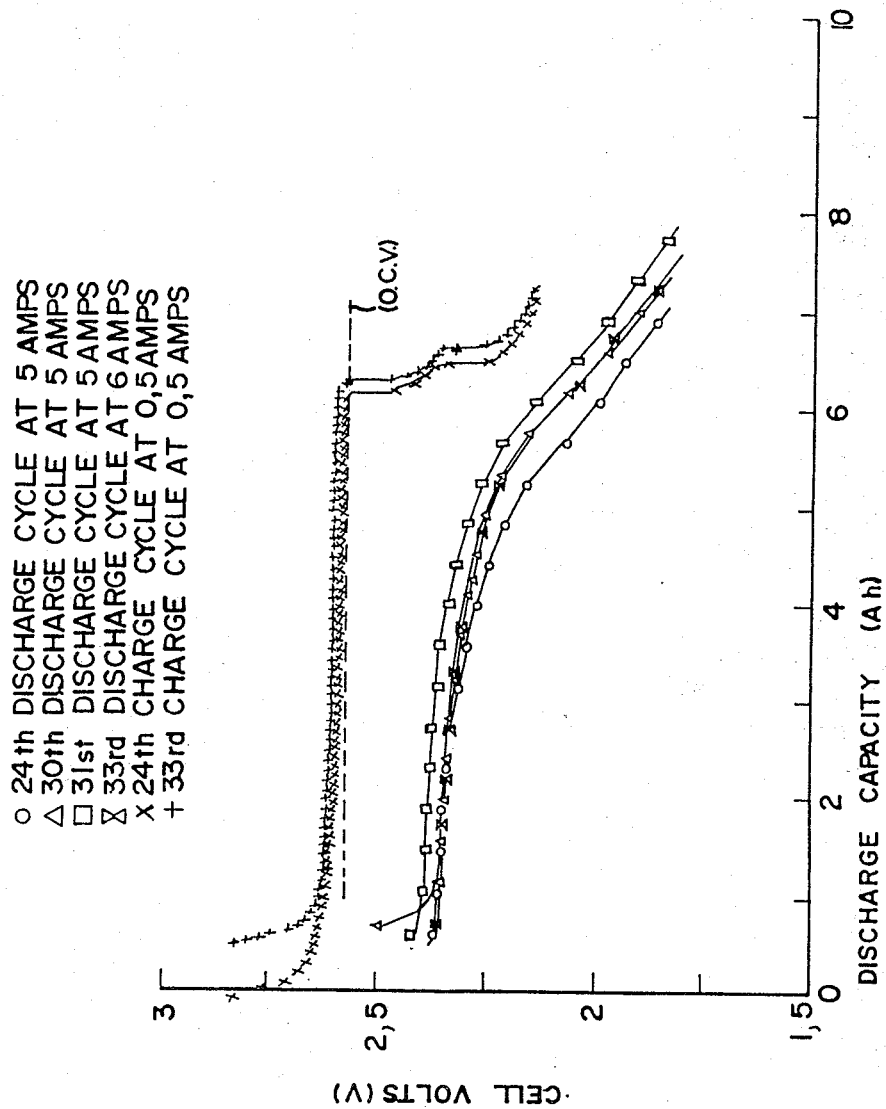

FIG. 8 shows selected charge and discharge half cycles in a plot of cell voltage against discharge capacity in Ah, for cell no 2. FIG. 9 is a similar plot as for cell no 3, and FIG. 10 is a similar plot for cell no 4, for when the cell was at 300° C., the change from 300° C. to 350° C. for cell no. 4 occurred between the 30th and 31st marked effect on capacity retention of the cathodes which were very tolerant to operation at temperatures up to 350° C. Discharge rates of up to 160 mAcm$^{-2}$ gave good charge and discharge curves with an operating voltage of more than 2,25 V for more than 50% of the cathode capacity at 350° C. (FIGS. 6, 10 and 12). Cell resistances were found to be fairly low and constant, and it was found that acceptable charge rates of up to 40 mAcm$^{-2}$ (FIGS. 11 and 12) can be used.

It should be noted that graphite foil seals should be used in the cells in preferance to aluminium seals for the cathode, as the sulphur in the cathode can in principle attack aluminium gaskets and seals.

Further tests were conducted to show the utility of selenium instead of sulphur for the purpose of the present invention. These tests are described in Example 3 hereunder.

Subsequent examination of the cathode matrices from the cells containing sulphur in Examples 1 and 2 above showed that the presence of even a low proportion of sulphur (1% by mass of the NaAlCl$_4$ in Example 1 and about 5% of the NaAlCl$_4$ by mass in Example 2) substantially affects the morphology of the nickel metal matrix. From photomicrographs of the matrix it was noted that nickel grain growth did not occur when sulphur was added, and that large agglomerates of fine crystallites (even smaller than the original nickel crystallites) were formed. Each such crystallite was found to contain traces of sulphur, present as Ni$_3$S$_2$.

EXAMPLE 3

Figure 13:
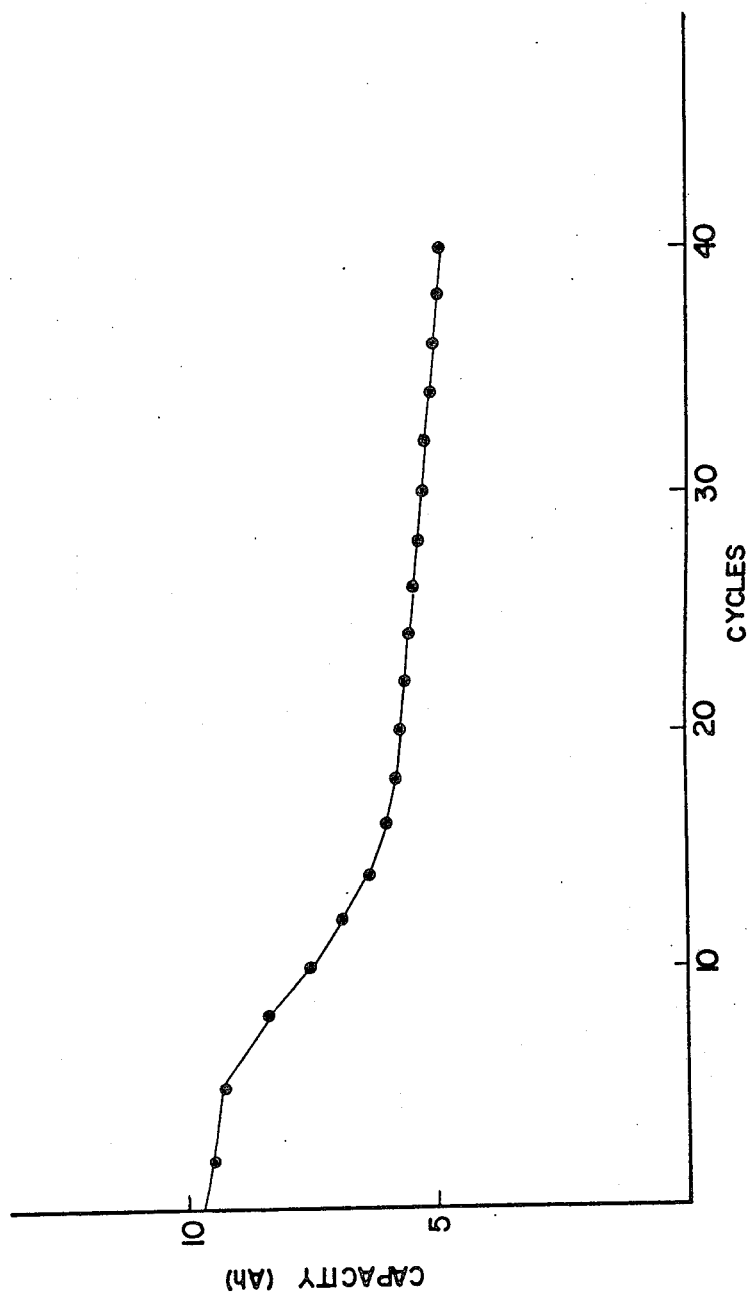
Figure 14:
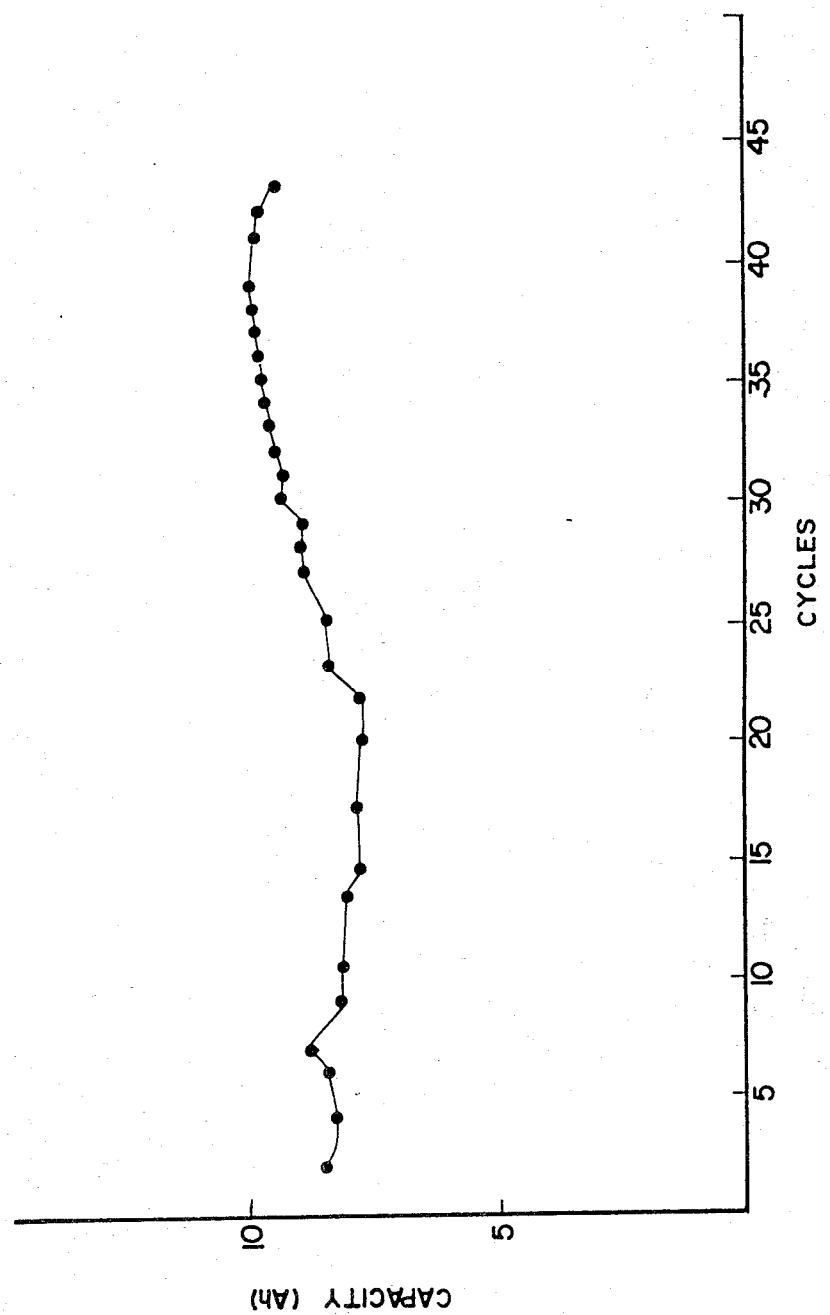
Figure 15:
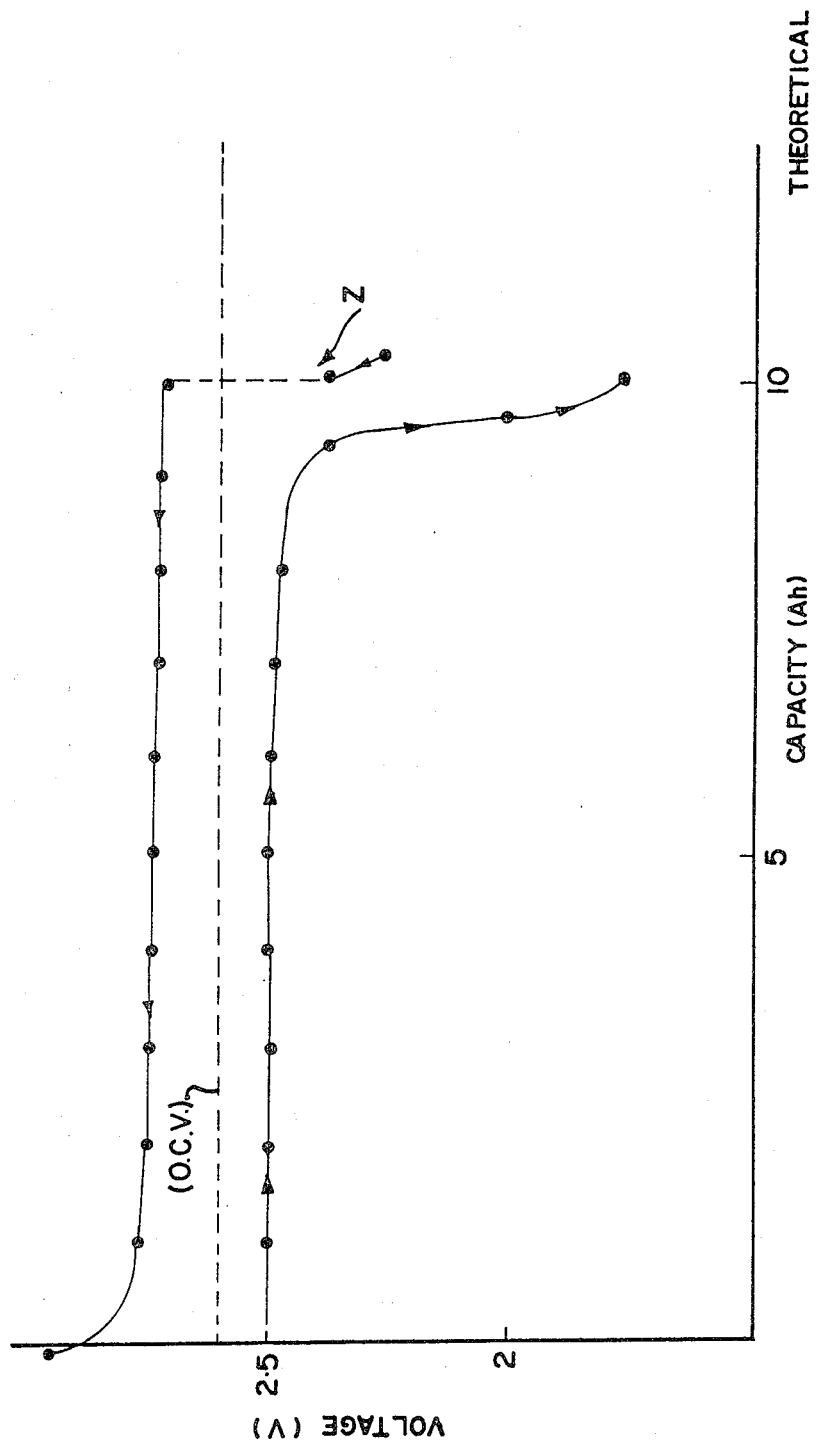

Two identical cathodes were prepared in a fashion similar to that described for Examples 1 and 2, from nickel powder (Inco Ni grade 255) and sodium chloride powder having a particle size of less than 125 microns, and the cathodes having a theoretical capacity of 0,3 Ah/g based on the cell reaction given in Example 1. One of these cathodes was impregnated with NaAlCl$_4$ (equimolar NaCl and AlCl$_3$) liquid electrolyte containing no sulphur or selenium as a control, and one was impregnated with a melt of said electrolyte containing 2% by mass of selenium. Both cathodes were loaded into cells of the type described with reference to Example 1 and were, after conditioning, cycled at the same temperatures, current densities, etc. The cell with the selenium doped electrolyte in its cathode had its electrolyte outside the cathode in the cathode compartment similarly doped with 2% by mass selenium. The results of these tests are shown in FIGS. 13, 14 and 15 in which FIG. 13 shows a plot of capacity in Ah against number of cycles for the control, FIG. 14 shows a similar plot for the cell having the cathode impregnated with electrolyte containing selenium, and FIG. 15 shows selected half cycle plots of cell voltage against capacity in Ampere hours for the cell whose cathode contained selenium. In each case the cells were charged at 8 mAcm$^{-2}$ (0,5 A) and discharged at 16 mAcm$^{-2}$ (1,0 A). The temperature was 300° C. for the control and the other cell was operated at 250° C. initially, but was heated up to 300° C. at about the 22nd cycle and kept at this temperature thereafter. FIG. 15 was plotted at 300° C. and the theoretical cell capacity was about 7,5–7,7 Ah.

From these results it was found that the control cell lost its cathode capacity fairly rapidly from cycle 5 to cycle 20, and after the 40th cycle had only about 40% of its theoretical capacity.

In the case of FIG. 14, where the cathode contained selenium, a rise in capacity was noted, corresponding to the increase in temperature from 250° C.–300° C. In FIG. 14, prior to the rise in temperature, capacity had remaind fairly constant, and after the increase in temperature, capacity rose to about 82% of its theoretical value.

From Example 3 it appears that selenium as well as sulphur resists the rapid fall off in cathode capacity encountered in Ni/NiCl$_2$ cathodes of the type in question where the sodium aluminium chloride electrolyte is not doped. Although selenium is sparingly soluble in the melt in question, its presence can be detected by the small shoulder on the charge cycle indicated at Z in FIG. 15 at about 2,25 V.

EXAMPLE 4

A cathode was prepared in a fashion similar to that described for Example 1 from nickel powder. (Inco Ni grade 287) and sodium chloride having a particle size of less than 125 microns to have a theoretical capacity of 0,3 Ah/g (0,33 Ah/cm$^3$) based on the cell reaction given for Example 1. The cathode was impregnated with NaAlCl$_4$ (equimolar NaCl and AlCl$_3$) liquid electrolyte containing 2% by mass sulphur. As in Example 3, the electrolyte outside the cathode contained the same proportion of the chalcogen dopant as the electrolyte used to impregnate the cathode. The mass ratio between the nickel and sulphur in this cell was 16,2:1 and this cell was operated at 300° C. in a direct comparison with a substantially identical control cell doped with sulphur which made up 5% by mass of the electrolyte inside and outside the cathode matrix, and having a mass ratio of nickel to sulphur of 4,75:1, and a theoretical capacity of 0,3 Ah/g (0,22 Ah/cm$^3$).

Figure 16:
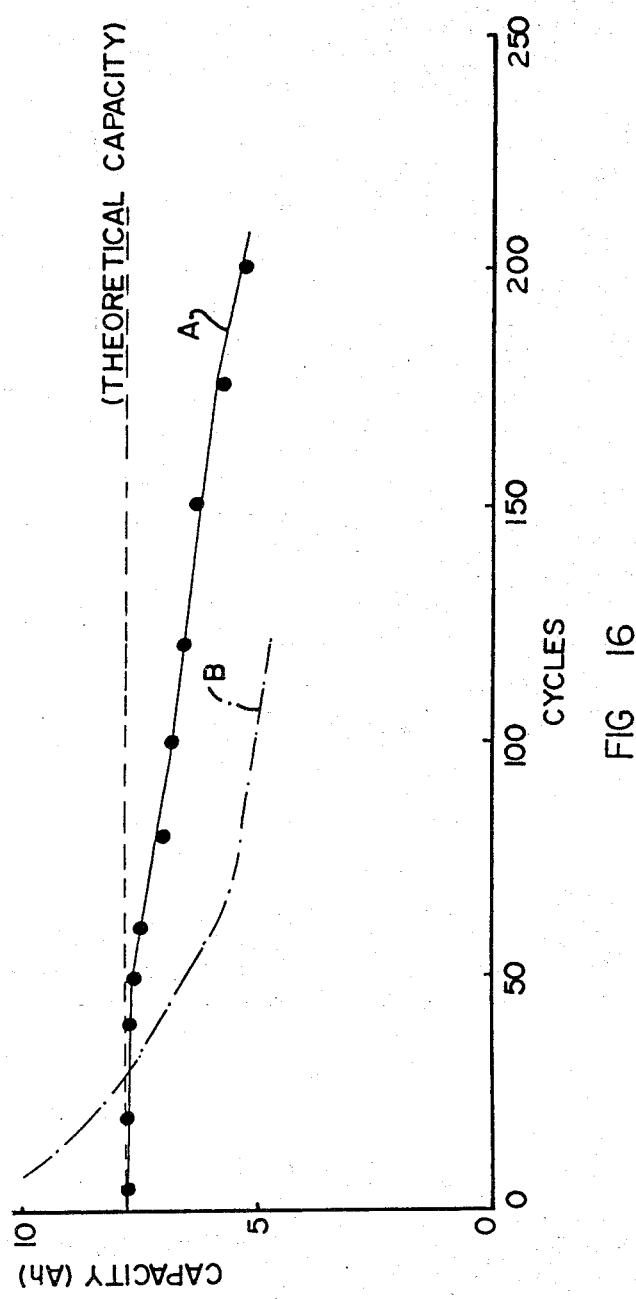
Figure 17:
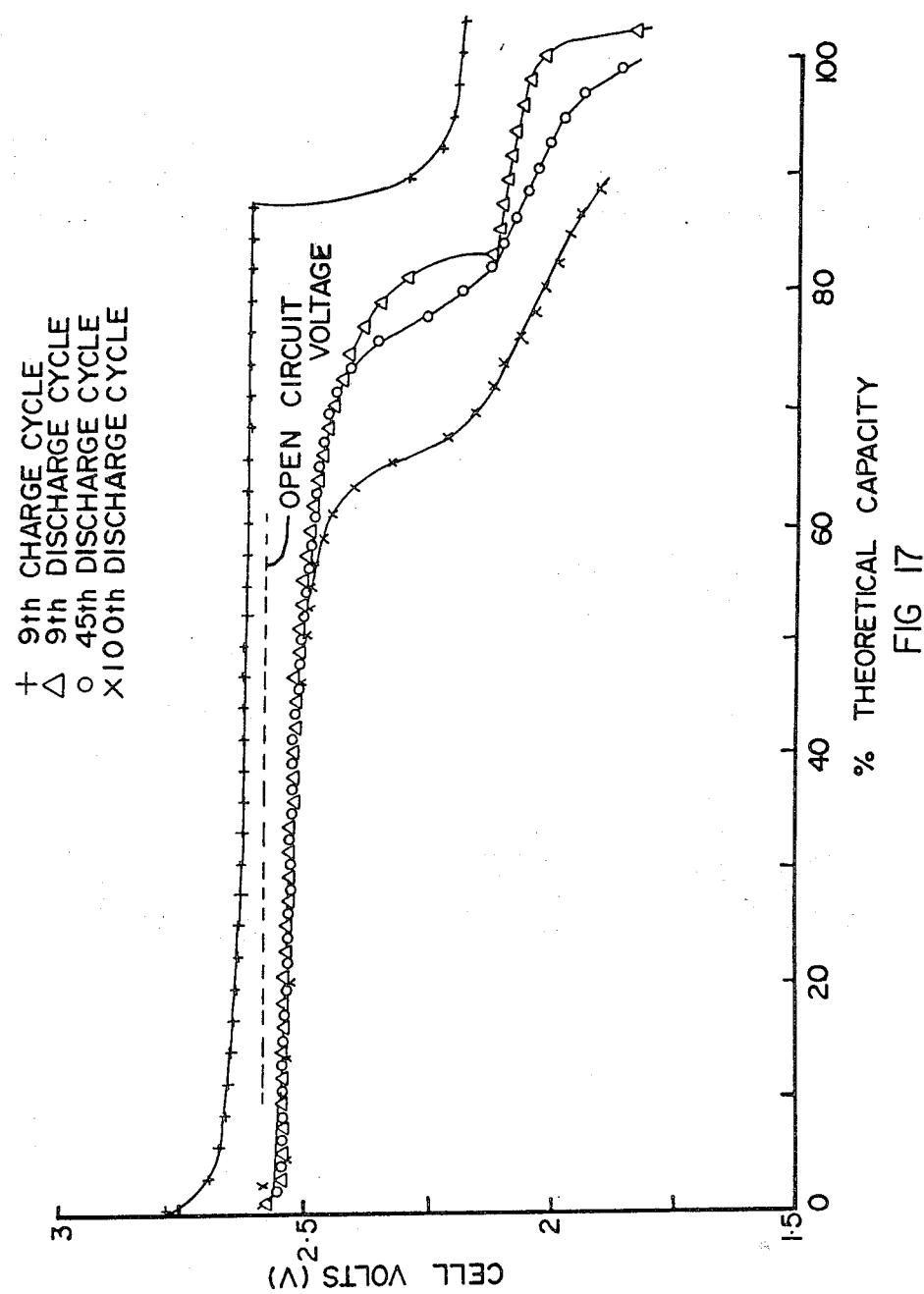
Figure 18:
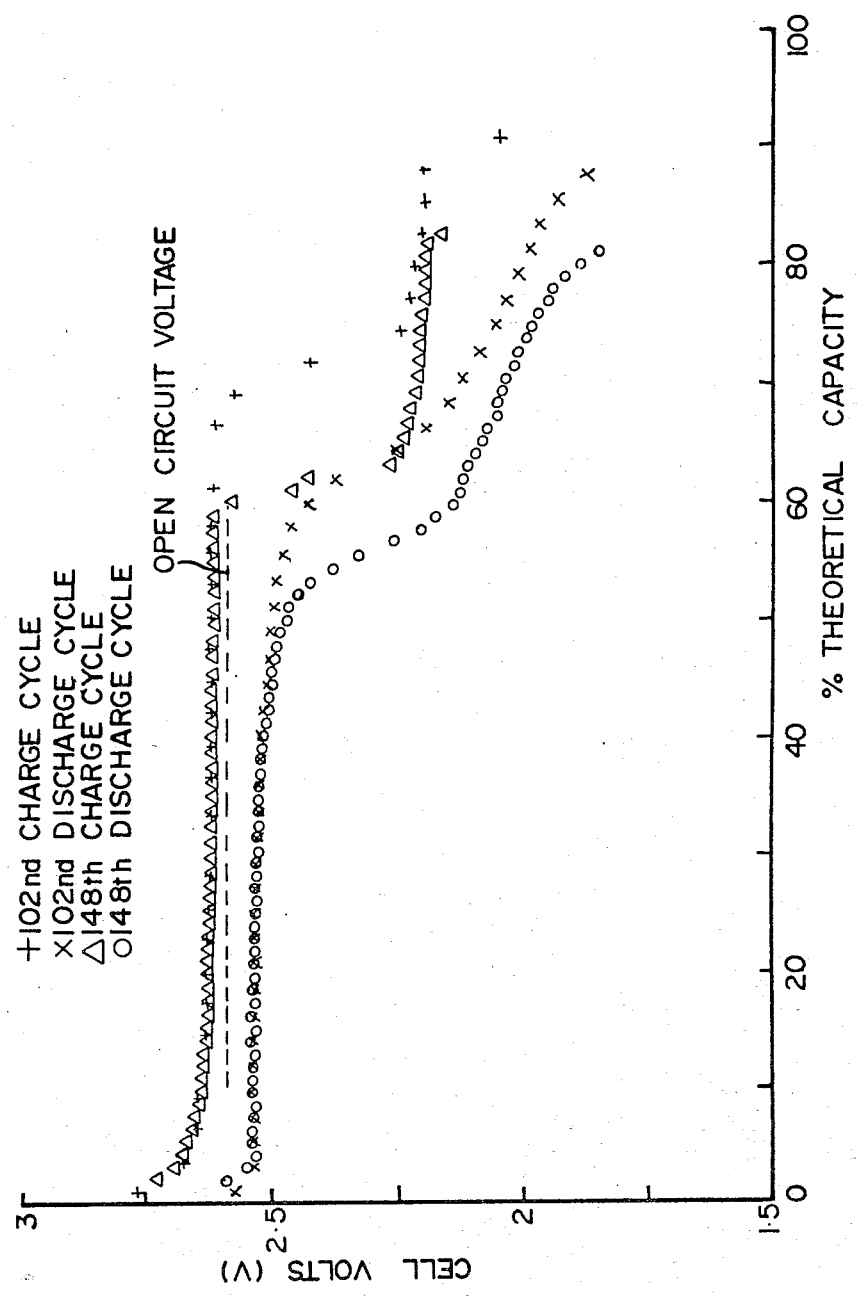

FIG. 16 shows a plot of capacity of the two cells against cycles, and demonstrates that the cell with 2% sulphur (curve A) loses capacity with cycling more slowly than the control cell with 5% sulphur (curve B). FIGS. 17 and 18 show plots of cell voltage against capacity for selected charge and discharge cycles of the cell with 2% sulphur. During these cycles the cell was operated at 300° C., being discharged at 1 A (20 mA/cm$^2$) and charged at 0,5 A. This test demonstrated that cells containing 2% by mass of sulphur can have better capacity retention in the long term than cells containing 5% sulphur. This can be an advantage as higher levels of sulphur can cause greater localized corrosion problems. This cell is still on test and operating.

EXAMPLE 5

Figure 19:
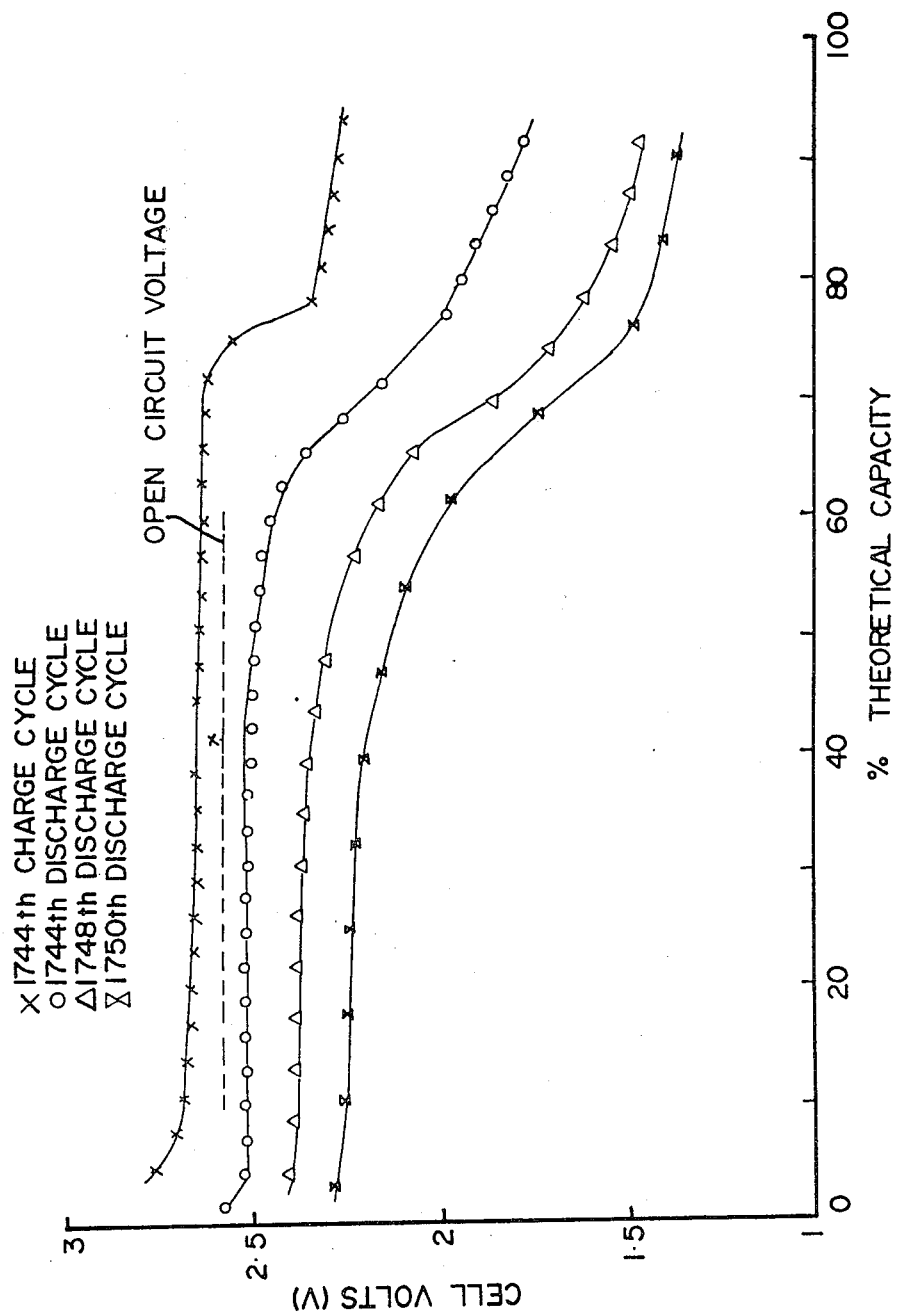

A cell was prepared substantially identical to the control of Example 4, and was cycled for more than 1750 cycles at 300° C., mostly at 100 mA/cm$^2$ (5 A) (the 1 hour rate) for both charge and discharge. FIG. 19 shows a plot of cell voltage against capacity for selected charge and discharge cycles after the cell had been put through about 1750 cycles. Capacity retention was found to remain high, and was found to be substantially independent of charge and discharge rates approaching the 1 hour discharge rate. Cell resistance was less than 3,5 ohm cm$^2$ after 1750 cycles. This cell is still on test and operating.

EXAMPLE 6

Figure 20:
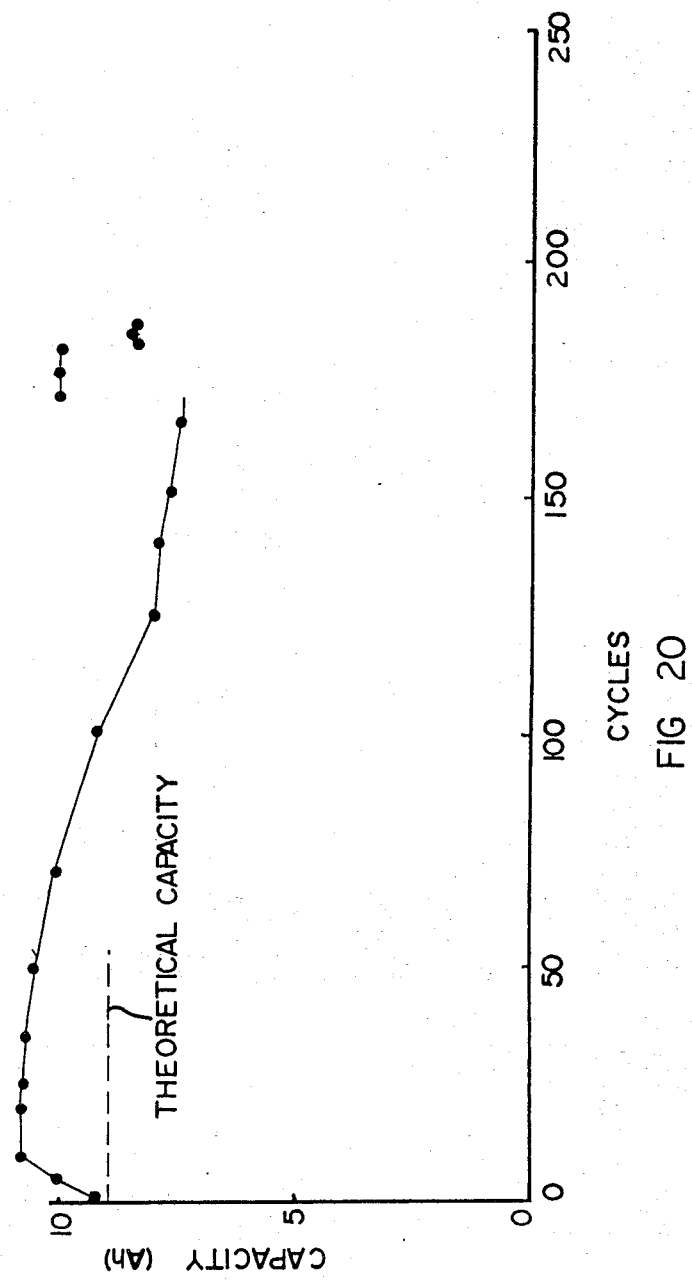
Figure 21:
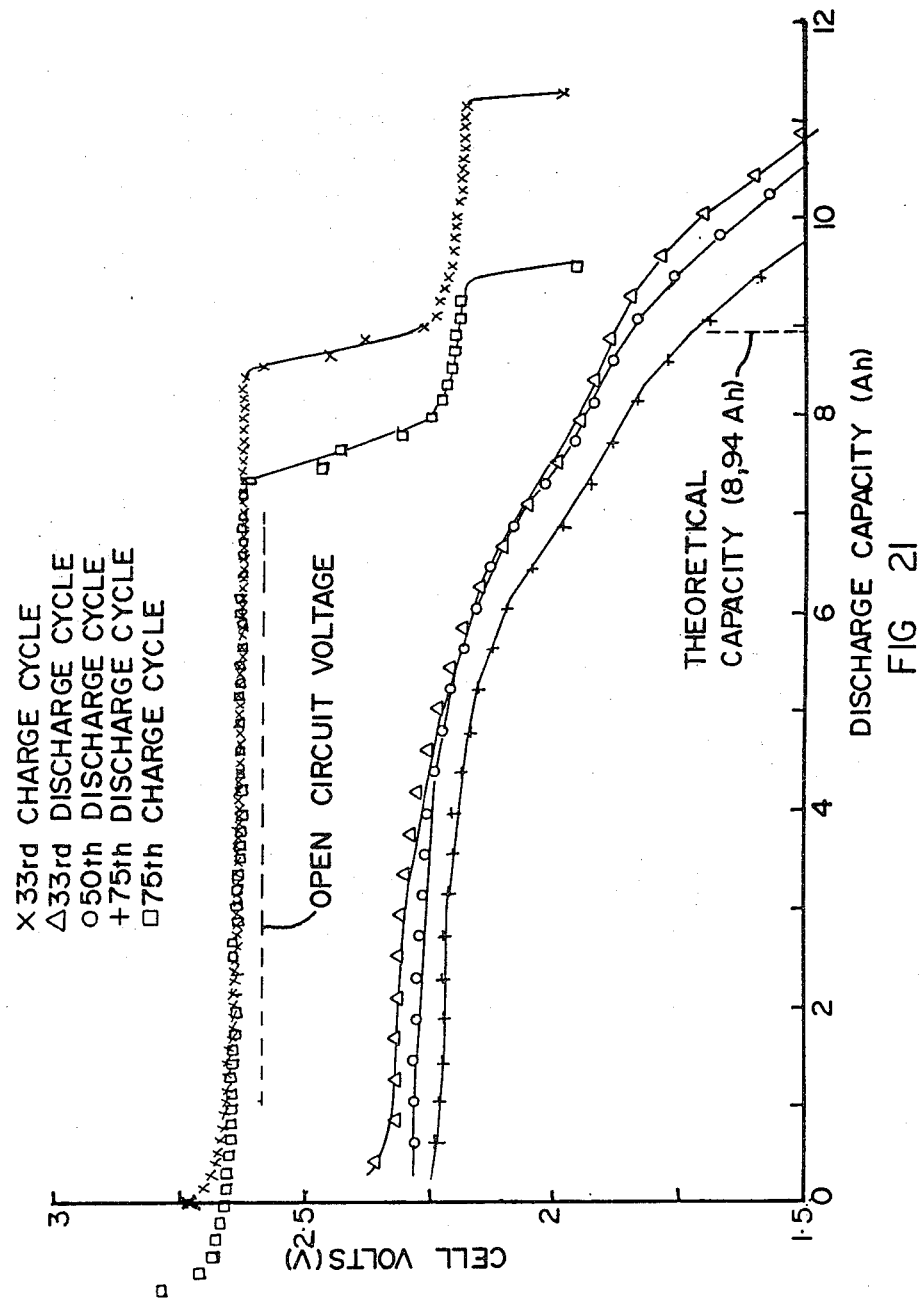
Figure 22:
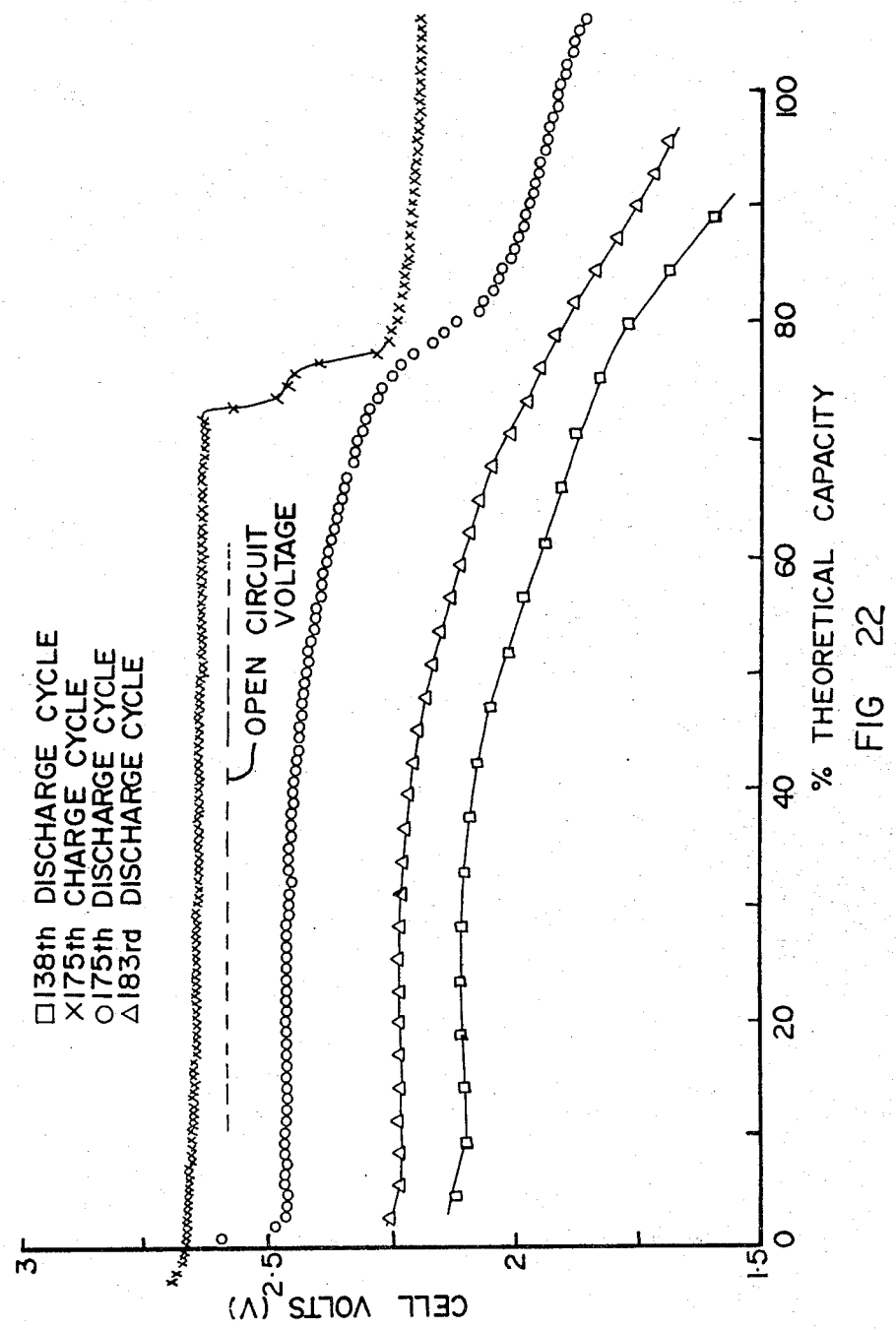
Figure 23:
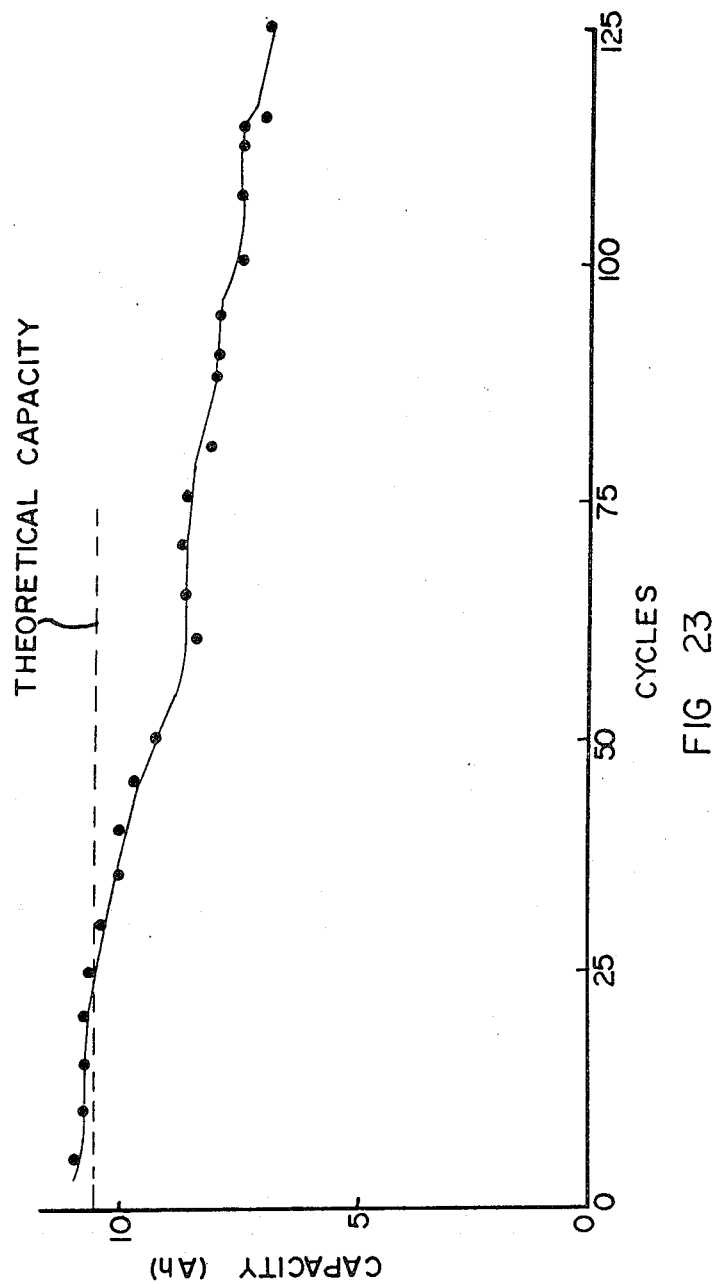
Figure 24:
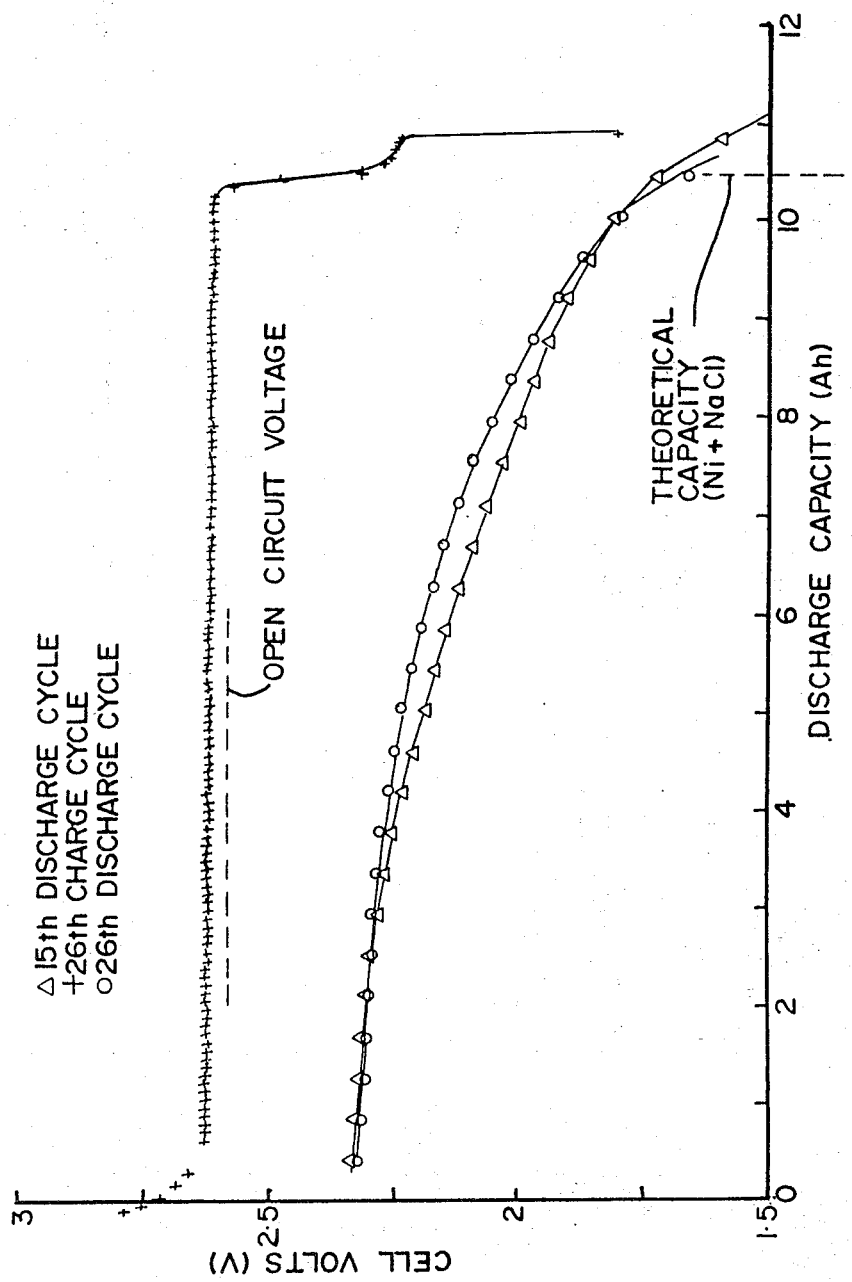
Figure 25:
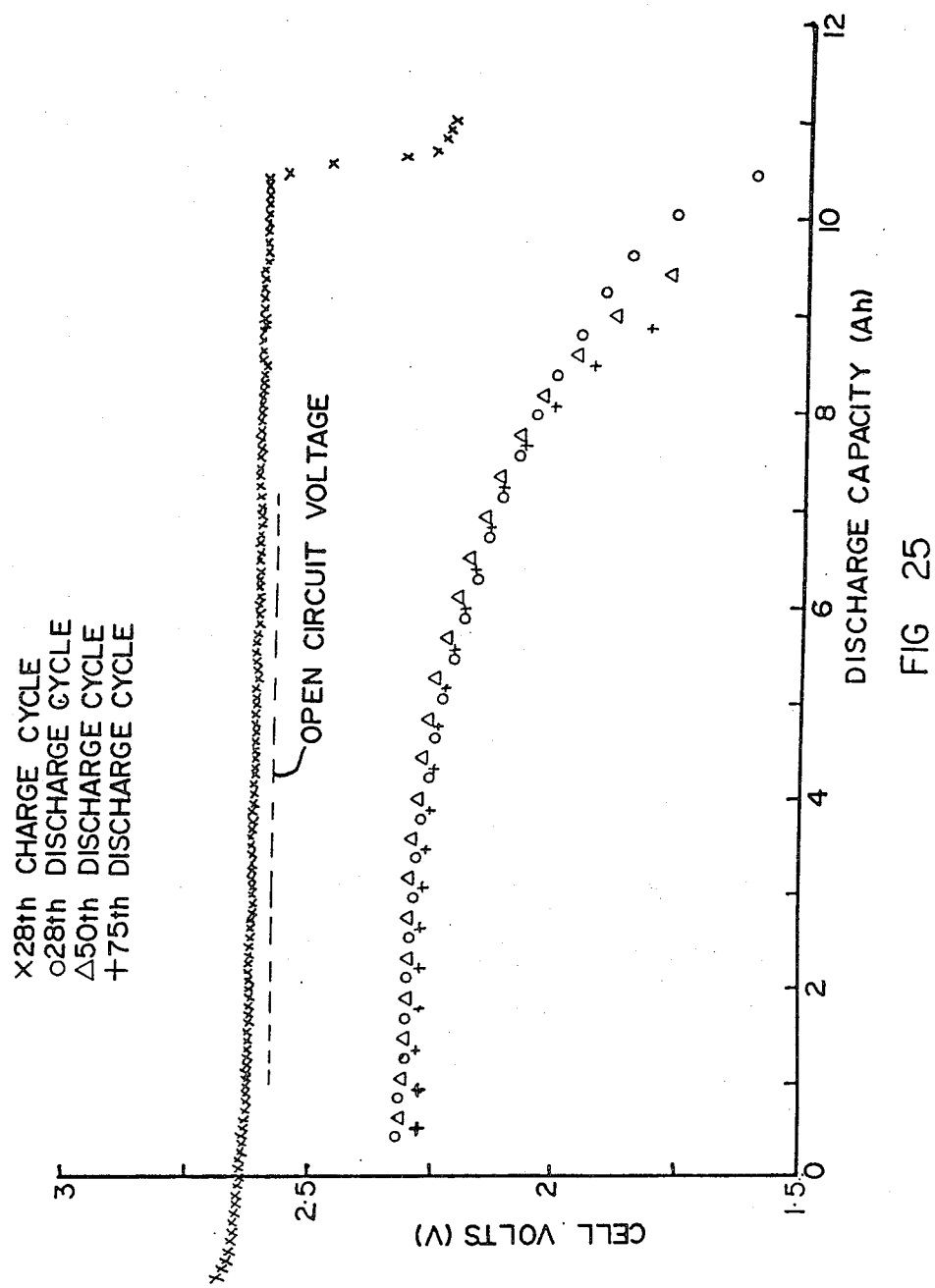

Two further cells were prepared using Inco Ni grade 287 nickel powder and sodium chloride of less than 125 micron particle size. They were prepared in a fashion similar to that described for Example 2 to have a mass ratio of nickel to sulphur of 7,5 but the cathodes were isostatically pressed before sintering, at 2400 psi (514,31 kPa), to have theoretical capacities after sintering respectively of 0,37 Ah/cm$^3$ (0,3 Ah/g) and 0,46 Ah/cm$^3$ (0,3 Ah/g). The capacity retention curves of these cells are shown in FIGS. 20 to 22 for the less dense cathode (0,37 Ah/cm$^3$) and in FIGS. 23 to 25 for the denser cathode (0,46 Ah/cm$^3$). FIGS. 20 and 23 show plots of cell capacity against cycles, and FIGS. 21, 22, 24 and 25 show plots of cell voltage against capacity for selected charge and discharge cycles at 300° C.

The cell whose cathode density was 0,37 Ah/cm$^3$ was discharged at 54 mA/cm$^2$ (3,0 A) for the first 10 cycles, at 90 mA/cm$^2$ from cycle 10 to cycle 170, at 18 mA/cm$^2$ from cycle 170 to cycle 180, and at 54 mA/cm$^2$ from cycle 180 to cycle 190, the charge rate being 9 mA/cm$^2$ throughout. Full theoretical capacity was still obtained after 100 cycles and 83% of theoretical capacity after 165 cycles. The cell whose cathode density was 0,46 Ah/cm$^3$ lost capacity at a slightly faster rate but still gave more than 90% of theoretical capacity after 50 cycles and 71% of theoretical capacity after 100 cycles. This cell was discharged throughout at 90 mA/cm$^2$ (5,0 A) and charged at 9 mA/cm$^2$. These cells are still on test and operating.

Examples 4 to 6 show the utility of cells having nickel:sulphur mass ratios in their cathodes respectively of 16,2:1, 4,75:1 and 7,5:1. From these results and other tests conducted by the Applicant, the Applicant believes that good utility in resisting a progressive drop in capacity with charge/discharge cycling will be achieved with ratios anywhere between 20:1 and 4:1, but the Applicant contemplates typically operating at nickel:sulphur ratios between 16:1 and 12:1. In this regard it should be noted that at the lower ratios (eg approaching 4:1 and below) excess sulphur can cause problems in long term operation, relating to the formation of sodium polysulphides and nickel sulphide in the cathode which is undesirable and in fact amounts to a form of corrosion of the nickel in the cathode.

EXAMPLE 7

A cathode was formed from a homogeneous mixture of 72,5 g of Inco Ni grade 287 nickel powder and 47,5 g of sodium chloride powder of less than 180 micron particle size, together with 2 g of finely divided nickel sulphide. This mixture was saturated with 104 g of liquid electrolyte (equimolar NaCl and AlCl$_3$) and loaded into a cell of the type described with reference to Example 1 having a beta-alumina separator and a liquid sodium anode, using a nickel strip/nickel gauze cathode current collector.

The cell was activated by charging and was put through a number of charge/discharge cycles at 250° C. The cell had a theoretical capacity of 0,3 Ah/g (0,26 Ah/cm$^3$) and was charged at 1 A (10 mA/cm$^2$) and discharged at 4 A. After activation the cathode mixture formed a porous nickel matrix in which NiCl$_2$ was dispersed as the active cathode substance and sulphur from the NiS became evenly dispersed in the liquid electrolyte.

A reversible constant capacity of 80% of the theoretical value was maintained for 23 cycles (cell still on test). The sulphur added via the NiS formed 0,7% by mass of the liquid electrolyte, i.e. the doping acted to add 0,7% by mass of sulphur to the electrolyte, and was equivalent to adding 0,7% by mass of pure sulphur thereto.

Figure 26:
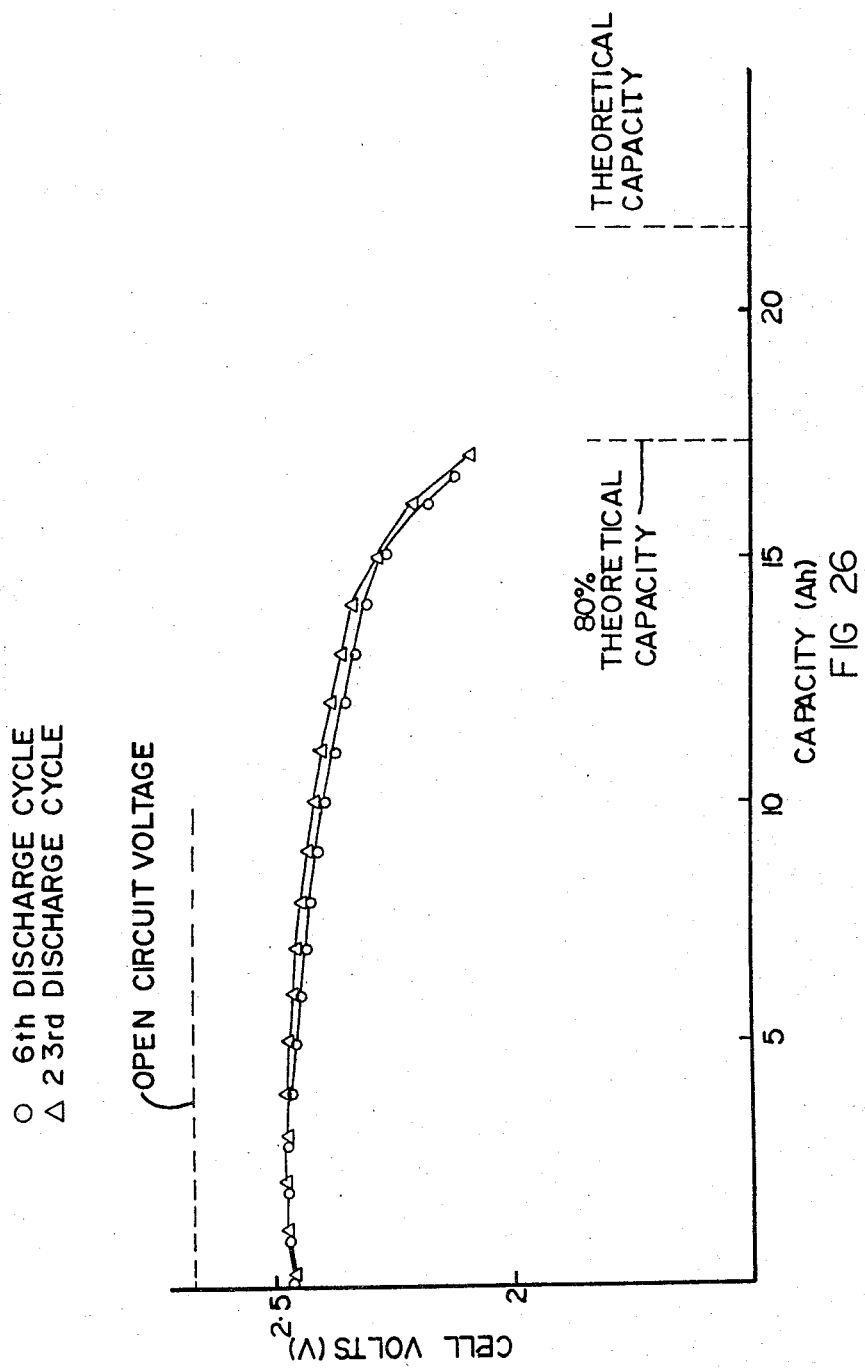
Figure 27:
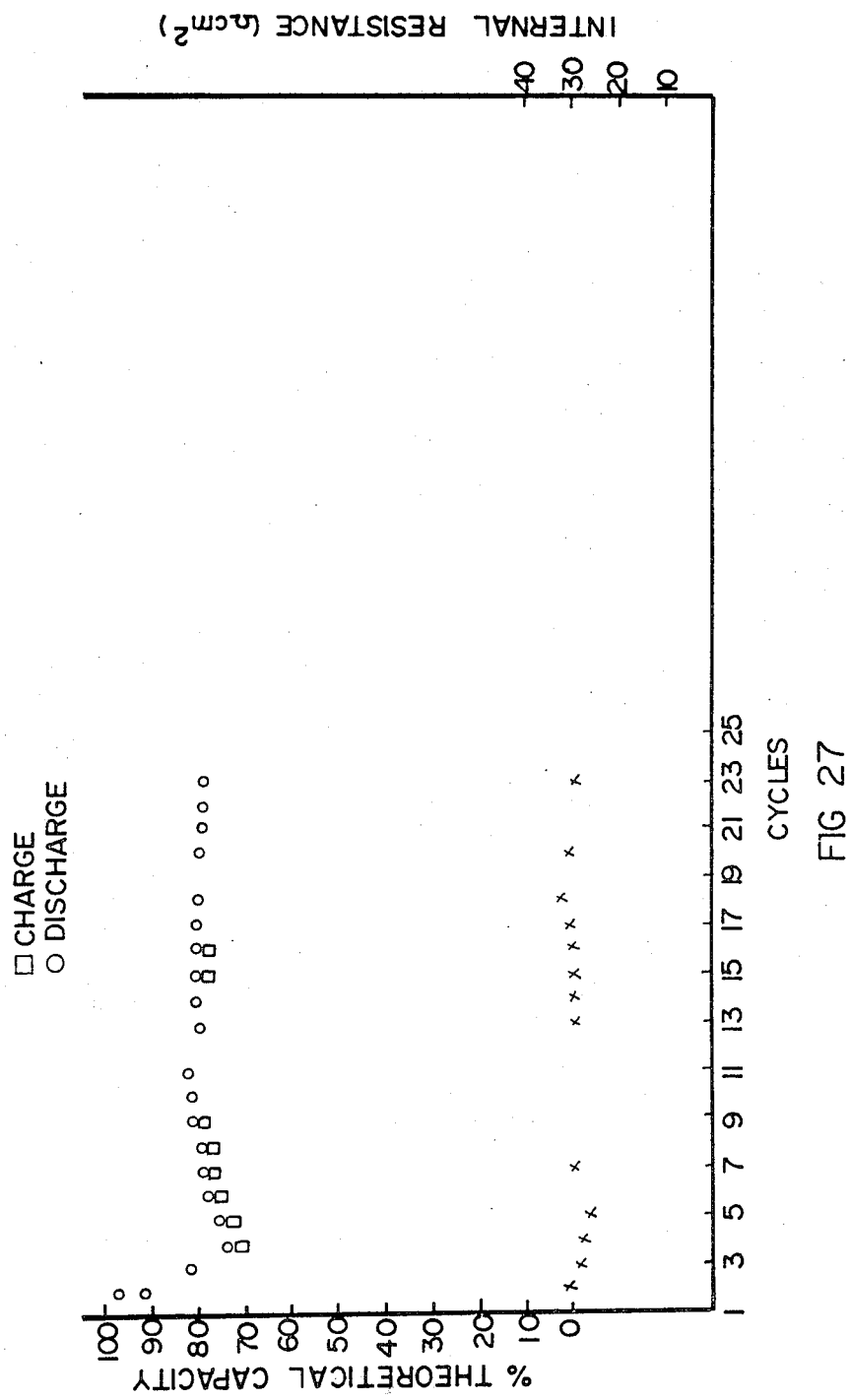

The capacity retention curves of the cell are shown in FIGS. 26 and 27. FIG. 27 is a plot of cell capacity against cycles and FIG. 26 shows plots of cell voltage against capacity for selected discharge cycles.

Example 7 demonstrates that doping in terms of the invention using chalcogen-containing compounds is feasible. It is thus possible, for suitable dopant compounds such as nickel sulphides or sulphides of iron, chromium, cobalt or manganese, or mixtures of two or more thereof to be used as the dopant to the nickel/sodium chloride mix before sintering and impregnation with liquid electrolyte. This would not be practicable with the pure chalcogens because of vapour pressure problems.

Without being bound by theory and with reference to Examples 1, 2 and 7 above, the Applicant believes that the utility of the present invention may be attributable to the fact that the chalcogen may act in the active cathode substance by occupying sites in the crystallites or at the grain or crystallite boundaries in the active cathode substance, thereby resisting a progressive increase in crystallite growth with consequent capacity loss during charge/discharge cycling. This chalcogen can be dispersed in the active cathode substance when it is formed, as described in Example 7; or it may be introduced via the electrolyte, entering the active cathode substance during progressive charge/discharge cycling.

According to this view, when introduced via the electrolyte, the chalcogen in the electrolyte will become progressively depleted as it migrates into the active cathode substance; and when introduced directly into the active cathode substance as in Example 7, some chalcogen will migrate into the electrolyte, with a balance possibly being reached. The distribution of the chalcogen in a mature cell, which has been cycled many times, may thus be different from that in a newly assembled cell. It is thus possible that most of the chalcogen can be present in the electrolyte of a newly assembled cell, when introduced via the electrolyte, but with most of it present in the active cathode substance in a mature cell, the distribution passing through on intermediate stage in between as the cell is cycled.

In this regard it should be noted that in a partially or fully charged cell the active cathode substance in fact forms part of or an extension of the matrix, the crystallites referred to in Examples 2 and 3 being formed during discharge of the active cathode substance and thus forming part of the matrix. It should further be noted that if all the chalcogen introduced into electrolyte or active cathode substance during assembly is not present in the electrolyte, then at least some of it must migrate into the active cathode substance, as there is nowhere else for it to go.

What is claimed is:

1. A cathode for an electrochemical cell, which cathode comprises an electronically conductive electrolyte-permeable macroscopically porous matrix impregnated with a sodium aluminium halide molten salt liquid electrolyte which contains chloride ions and is molten at the operating temperature of the cell, the matrix having a chlorinated nickel-containing substance dispersed therein as the active cathode substance a minor proportion of a suitable chalcogen being dispersed in at least one member of the group comprising said electrolyte and said active cathode substance, for resisting a progressive drop in the capacity of the cathode with repeated charge/discharge cycling thereof.

2. A cathode as claimed in claim 1, in which the chalcogen is sulphur.

3. A cathode as claimed in claim 1, in which the chalcogen is selenium.

4. A cathode as claimed in claim 1, in which the nickel-containing substance is NiCl$_2$.

5. A cathode as claimed in claim 1, in which the nickel-containing substance is an alloy of nickel together with a minor molar proportion of at least one member of the group comprising iron, chromium, cobalt and manganese.

6. A cathode as claimed in claim 1, in which the nickel-containing substance is nickel which contains a minor molar proportion of at least one member of the group comprising phosphorus, boron, silicon, nitrogen and carbon.

7. A cathode as claimed in claim 1, in which the liquid electrolyte contains not more than 10% by mass of the chalcogen.

8. A cathode as claimed in claim 7, in which the liquid electrolyte contains not more than 5% by mass of the chalcogen.

9. A cathode as claimed in claim 8, in which the electrolyte contains not more than 2% by mass of the chalcogen.

10. A cathode as claimed in claim 1, in which the mass ratio of nickel in the chlorinated nickel-containing substance:chalcogen in the cathode is between 20:1 and 4:1.

11. A cathode as claimed in claim 10, in which the mass ratio of nickel in the chlorinated nickel-containing substance:chalcogen in the cathode is between 16:1 and 12:1.

12. A cathode as claimed in claim 1, in which the chalcogen is present in the liquid electrolyte in finely divided form.

13. A cathode as claimed in claim 1, in which the electrolyte is a sodium aluminium chloride molten salt electrolyte.

14. A cathode as claimed in claim 13, in which the electrolyte comprises a mixture of alkali metal halide and aluminium halide in the molar ratio of 1:1, so that the relative quantities of the alkali metal ions, aluminium ions and halide ions conform substantially with the stoichiometric product $MAlX_4$ wherein:

M represents alkali metal cations; and

X represents halide anions.

15. A cathode as claimed in claim 13, in which the electrolyte contains an alkali metal fluoride dopant, the dopant forming not more than 20% by mass of the electrolyte.

16. An electrochemical cell which comprises a cathode as claimed in claim 1, a sodium anode which is liquid at the operating temperature of the cell, a sodium aluminium halide molten salt liquid electrolyte in contact with the exterior of the cathode and having the same composition as the liquid electrolyte impregnated into the matrix of the cathode, and, between the anode and the electrolyte and isolating the anode from the electrolyte, a solid conductor of sodium ions or a micromolecular sieve which contains sodium sorbed therein.

17. A cell as claimed in claim 16, in which the electrolyte is isolated from the anode by a solid conductor of sodium ions selected from the group comprising beta-alumina and nasicon, sodium being the only alkali metal present in the liquid electrolyte.

18. A cell as claimed in claim 16, in which the anode is isolated from the electrolyte by a micromolecular sieve selected from the group comprising zeolite 13X, zeolite 3 A and zeolite 4 A.

19. In the operation of a cathode comprising an electronically conductive electrolyte-permeable matrix impregnated with a sodium aluminium halide molten salt liquid electrolyte which comprises chloride ions and is molten at the operating temperature of the cell, the matrix having a chlorinated nickel-containing substance dispersed therein as the active cathode substance, the method of resisting a progressive drop in the capacity of the cathode with repeated charge/discharge cycling thereof, which comprises doping at least one member of the group comprising the liquid electrolyte and the active cathode substance with a minor proportion of a suitable chalcogen so that the chalcogen is dispersed therein.

* * * * *